(12) United States Patent
Kitamura et al.

(10) Patent No.: US 9,533,550 B2
(45) Date of Patent: Jan. 3, 2017

(54) VEHICLE AIR CONDITIONING CONTROL DEVICE

(71) Applicant: MITSUBISHI ELECTRIC CORPORATION, Chiyoda-ku (JP)

(72) Inventors: Shoichi Kitamura, Tokyo (JP);
Hiroyuki Hashimoto, Tokyo (JP);
Kazuyuki Mori, Tokyo (JP); Satoru Takahashi, Tokyo (JP); Shoji Isoda, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 34 days.

(21) Appl. No.: 14/651,457

(22) PCT Filed: Dec. 26, 2013

(86) PCT No.: PCT/JP2013/084919
§ 371 (c)(1),
(2) Date: Jun. 11, 2015

(87) PCT Pub. No.: WO2014/112320
PCT Pub. Date: Jul. 24, 2014

(65) Prior Publication Data
US 2015/0306937 A1 Oct. 29, 2015

(30) Foreign Application Priority Data
Jan. 17, 2013 (JP) .................................. 2013-005916

(51) Int. Cl.
*G06F 7/00* (2006.01)
*B60H 1/00* (2006.01)
(Continued)

(52) U.S. Cl.
CPC ...... *B60H 1/00771* (2013.01); *B60H 1/00764* (2013.01); *B61D 27/00* (2013.01);
(Continued)

(58) Field of Classification Search
USPC .. 701/36; 700/299, 300; 237/12.3 R, 12.4 R; 62/237; 236/46 R
See application file for complete search history.

(56) References Cited

U.S. PATENT DOCUMENTS 7,808,195 B2   10/2010   Kitanaka et al.
8,554,376 B1 * 10/2013   Matsuoka ........... H04L 12/2825
                                              236/46 R
(Continued)

FOREIGN PATENT DOCUMENTS

CN    101321645 A    12/2008
CN    102470881 A    5/2012
(Continued)

OTHER PUBLICATIONS

International Search Report issued Mar. 25, 2014 in PCT/JP2013/084919 filed Dec. 26, 2013.
(Continued)

*Primary Examiner* — Ronnie Mancho
(74) *Attorney, Agent, or Firm* — Oblon, McClelland, Maier & Neustadt, L.L.P.

(57) ABSTRACT

A vehicle air conditioning control device calculates, through a thermal load calculating unit, a vehicle interior thermal load Q on the basis of, for example, a vehicle interior temperature Tin, a vehicle interior humidity Hin, a vehicle exterior temperature Tout, a passenger load factor θ, and a vehicle-interior-temperature set value Tset. Through an air conditioning output calculating unit, the vehicle air conditioning control device calculates an output command value for an air conditioner on the basis of a vehicle-interior-temperature upper-limit value Tmax, a vehicle-interior-temperature lower-limit value Tmin, the thermal load Q, power-running/regenerative electric power P, and then, corrects the calculated output command value for the air conditioner on the basis of power-running/regenerative electric power Pf at
(Continued)

or after a prediction time point and of a passenger load factor θf at or after the prediction time point.

11 Claims, 16 Drawing Sheets

(51) Int. Cl.
 *B61D 27/00* (2006.01)
 *G05D 23/19* (2006.01)
(52) U.S. Cl.
 CPC ..... *G05D 23/1917* (2013.01); *G05D 23/1927* (2013.01); *B60H 2001/00992* (2013.01); *Y02T 30/42* (2013.01)

(56) References Cited

U.S. PATENT DOCUMENTS

| | | | |
|---|---|---|---|
| 8,892,277 B2 | 11/2014 | Shiota et al. | |
| 2004/0168455 A1 | 9/2004 | Nakamura | |
| 2008/0147270 A1* | 6/2008 | Sakane | B60H 1/00864 701/36 |
| 2010/0147184 A1 | 6/2010 | Kitanaka et al. | |
| 2011/0167850 A1* | 7/2011 | Itoh | F25B 5/04 62/160 |
| 2012/0109429 A1 | 5/2012 | Shiota et al. | |
| 2014/0144998 A1* | 5/2014 | Ichishi | B60H 1/00314 237/12.3 A |
| 2014/0309789 A1* | 10/2014 | Ricci | B60Q 1/00 700/276 |

FOREIGN PATENT DOCUMENTS

| | | |
|---|---|---|
| JP | 1-214201 A | 8/1989 |
| JP | 2001-30903 A | 2/2001 |
| JP | 2003-285637 A | 10/2003 |
| JP | 2004-291899 A | 10/2004 |
| JP | 4244676 B2 | 3/2009 |
| JP | 2012-17002 A | 1/2012 |
| JP | 2012-17003 A | 1/2012 |
| JP | 2012-148746 A | 8/2012 |
| WO | 2007/132515 | 11/2007 |

OTHER PUBLICATIONS

Combined Chinese Office Action and Search Report issued Jul. 6, 2016 in Patent Application No. 201380070663.4 (with English translation of the Search Report).
International Preliminary Report on Patentability and Written Opinion issued Jul. 30, 2015 in PCT/JP2013/084919 (with English language translation).
Extended European Search Report issued Aug. 24, 2016 in Patent Application No. 13871731.9.

* cited by examiner

F I G . 4
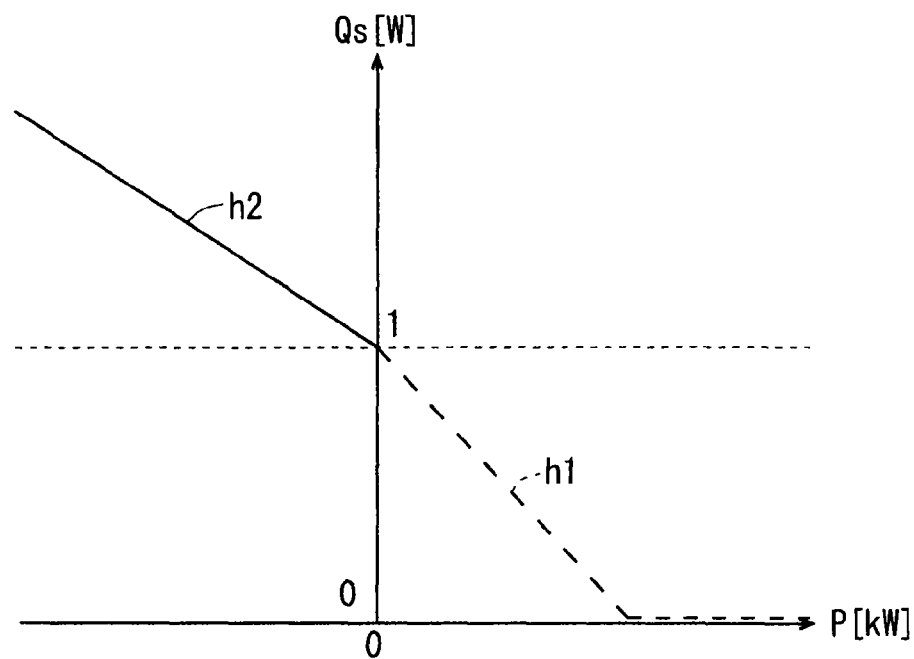
F I G . 5
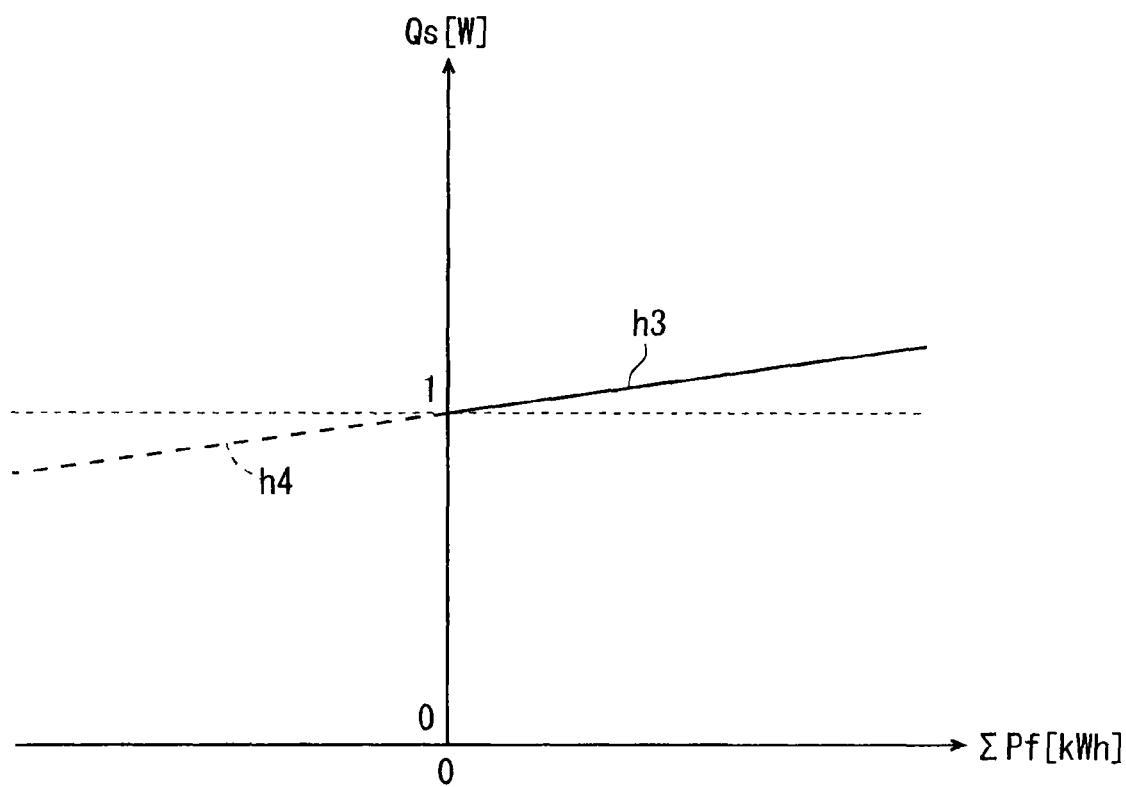

F I G . 8
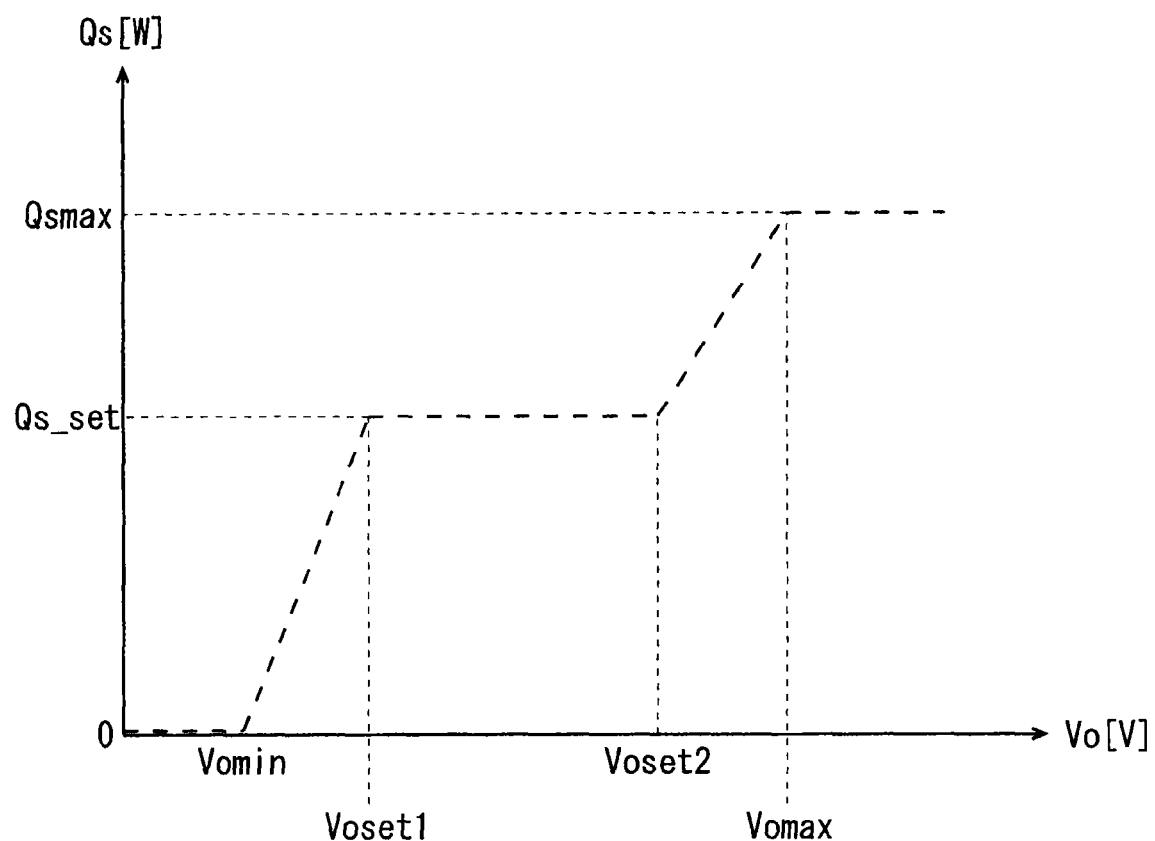

VEHICLE AIR CONDITIONING CONTROL DEVICE

TECHNICAL FIELD

The present invention relates to a vehicle air conditioning control device to be mounted on a vehicle to control air conditioning in the vehicle.

BACKGROUND ART

Various techniques have been proposed for vehicle air conditioning control devices to be mounted on vehicles of, for example, trains to control the air conditioning in the vehicle (hereinafter also described as "vehicle interior"). The traditional vehicle air conditioning control devices detect the vehicle interior temperature, the vehicle interior humidity, and the outside-air temperature and control the air conditioning capacity on the basis of the difference between the set temperature and the vehicle interior temperature, of the vehicle interior humidity, and of the outside-air temperature.

When the outside-air temperature is high during, for example, summertime, a number of passengers get aboard the vehicle after the opening of the doors at the arrival in a station, and then, the vehicle interior temperature increases due to the air exchange at the opening of the door and to the heat emanating from the passengers.

The traditional vehicle air conditioning control devices perform so-called feedback control to enhance the air conditioning capacity with detection of an increase in vehicle interior temperature. Unfortunately, there is a time lag between the detection of an increase in vehicle interior temperature and the start of the effective air conditioning, resulting in temporary loss in the vehicle interior comfort.

Thus, with attention directed to the change in vehicle interior comfort, techniques have been devised which controls the vehicle interior air conditioning in advance by predicting, before the arrival in the next station, the temperature change at the time of arrival in the next train on the basis of the passenger load factor at the next station that is computed from the statistical predictions (see, for example, Patent Documents 1 and 2).

The vehicle air conditioning control device having the vehicle air conditioning control method disclosed in Patent Document 1 applied thereto performs a mathematical operation on an air conditioning reference temperature in the vehicle on the basis of the vehicle interior temperature, the vehicle exterior temperature, the vehicle interior humidity, and the passenger load factor of the vehicle. The vehicle air conditioning control device determines the air conditioning control pattern for providing the air conditioning in the vehicle on the basis of the air conditioning reference temperature obtained from the mathematical operation, and then, controls a vehicle air conditioning device on the basis of the air conditioning control pattern that is determined.

In particular, the vehicle air conditioning control device disclosed in Patent Document 1 provides the vehicle interior air conditioning by starting an air conditioning compressor included in the vehicle air conditioning device when the difference between the vehicle interior temperature and the air conditioning reference temperature exceeds a given value. The vehicle air conditioning control device also provides the vehicle interior air conditioning under the following condition even when the difference between the vehicle interior temperature and the air conditioning reference temperature falls below the given value.

In a case where the time between the measurement of the vehicle interior temperature and the arrival in the next station is shorter than the restart prevention time element that is predetermined for the air conditioning compressor and the passenger load factor at the next station is predicted to exceed the predetermined value, in other words, the number of passengers going on board at the next station is predicted to be over a given number, the vehicle air conditioning control device starts the air conditioning compressor before the arrival in the next station. The vehicle air conditioning control device provides the vehicle interior air conditioning by controlling the vehicle air conditioning device on the basis of the passenger load factor predicted for the next station.

Thus, even if the difference between the vehicle interior temperature and the air conditioning reference temperature falls below the given value, with the prediction that passengers over the given number go on board at the next station, the vehicle air conditioning control device disclosed in Patent Document 1 continues the startup of the air conditioning compressor during startup or starts the air conditioning compressor at rest before the arrival in the next station as long as the restart prevention time element is not affected. This provides an effective vehicle interior air conditioning and prevents the vehicle interior environment to be uncomfortable even when a number of passengers come on board at once.

The vehicle air conditioning device disclosed in Patent Document 2 controls air conditioning as described below. The vehicle air conditioning device predicts, before the arrival in the next station, the passenger load factor at the arrival time in the next station, and then, obtains a corrected temperature on the basis of the passenger load factor that is predicted. The vehicle air conditioning device obtains the air conditioning reference temperature by adding the corrected temperature that is obtained to the vehicle set temperature, compares the air conditioning reference temperature and the vehicle interior temperature, and performs the air conditioning control on the basis of the comparison results.

Thus, the vehicle air conditioning device disclosed in Patent Document 2 is configured to perform the air conditioning control corresponding to the air conditioning reference temperature for the running between the next station and the station after next before the vehicle arrives in the next station. This provides the pleasant vehicle interior air conditioning at the arrival of the vehicle in the next station and at the time of departure from the next station.

Thus, the vehicle air conditioning control device disclosed in Patent Document 1 and the vehicle air conditioning device disclosed in Patent Document 2 are configured to improve the vehicle interior comfort. Meanwhile, with attention directed to the power consumption required for the running of the train, in other words, the power-running/regenerative electric power, techniques for controlling the vehicle interior air conditioning have been devised with consideration given to energy saving and power saving (see, for example, Patent Documents 3 and 4).

The electric-train control device disclosed in Patent Document 3, which includes load control means, is configured such that the surplus regenerative power can be consumed by the load of an auxiliary power source device. Consequently, while the electric train is in the regenerative braking state, the regenerative energy can be consumed by the load of the auxiliary power source device such as a cooler, resulting in the improved energy saving.

The control device having the electric-train controlling method disclosed in Patent Document 4 applied thereto monitors the operation information including the operation conditions and the power consumption during the operation of the train. For the power-running command that is input as the operation command through an input unit, the control device forces the control command for the cooler into OFF to stop the cooler even if the input command for the cooler is ON. When the operation command is not the power-running command and the main electric motor consumes a small amount of current, the control device causes the control command for the cooler to turn into ON at the time when the input command for the cooler turns into ON. Thus, the stoppage of the cooler during power running levels the power consumption in the entire train, resulting in a reduction in the peak power of the substation, in other words, power saving.

PRIOR ART DOCUMENTS

Patent Documents

Patent Document 1: Japanese Patent No. 3842688
Patent Document 2: Japanese Patent Application Laid-Open No. 2012-17003
Patent Document 3: International Publication No. WO 2007/132515
Patent Document 4: Japanese Patent Application Laid-Open No. 01-214201 (1989)

SUMMARY OF INVENTION

Problems to be Solved by the Invention

Although the techniques disclosed in Patent Documents 1 and 2 improves the vehicle interior comfort at the time of departure from the next station through the air conditioning control performed prior to the arrival in the next station, no consideration is given to energy saving and power saving.

According to the techniques disclosed in Patent Documents 3 and 4, meanwhile, the air conditioning control performed in accordance with the power consumption required for the running of the train provides the energy saving or the power saving, but the vehicle interior comfort may be impaired instead.

Thus, there is a demand for the vehicle air conditioning control device capable of adequate air conditioning control from the comprehensive viewpoint of the energy saving, the power saving, and the vehicle interior comfort.

The present invention has an object to provide a vehicle air conditioning control device capable of adequate air conditioning control from the comprehensive viewpoint of energy saving, power saving, and vehicle interior comfort.

Means to Solve the Problems

The vehicle air conditioning control device according to the present invention is a vehicle air conditioning control device to be included in a vehicle to control an air conditioner in the vehicle and includes: a target environment condition setter that inputs target environment conditions including a vehicle-interior-temperature set value, a vehicle-interior-temperature upper-limit value, and a vehicle-interior-temperature lower-limit value that are predetermined; a vehicle interior environment detector that detects a vehicle interior environment including a vehicle interior temperature and a vehicle interior humidity; a vehicle exterior environment detector that detects a vehicle exterior environment including a vehicle exterior temperature being a temperature of the outside of the vehicle; a vehicle condition detector that detects vehicle conditions including a position, a passenger load factor, and power-running/regenerative electric power of the vehicle; a vehicle condition predicting unit that predicts an acceleration at or after a prediction time point, a velocity at or after the prediction time point, a slope at or after the prediction time point, and the passenger load factor at or after the prediction time point of the vehicle on the basis of a travel plan and passenger-load-factor information indicating a past passenger load factor of the vehicle; a thermal load calculating unit that calculates a thermal load in the vehicle on the basis of the vehicle interior temperature and the vehicle interior humidity that are detected by the vehicle interior environment detector, the vehicle exterior temperature that is detected by the vehicle exterior environment detector, the passenger load factor that is detected by the vehicle condition detector, and the vehicle-interior-temperature set value that is input by the target environment condition setter; a power-running/regenerative electric power predicting unit that predicts the power-running/regenerative electric power at or after the prediction time point on the basis of the acceleration at or after the prediction time point, the velocity at or after the prediction time point, the slope at or after the prediction time point, and the passenger load factor at or after the prediction time point of the vehicle that are predicted by the vehicle condition predicting unit; an air conditioning output calculating unit that calculates an output command value for the air conditioner on the basis of the vehicle-interior-temperature upper-limit value and the vehicle-interior-temperature lower-limit value that are input by the target environment condition setter, the thermal load that is calculated by the thermal load calculating unit, the power-running/regenerative electric power that is detected by the vehicle condition detector, the power-running/regenerative electric power at or after the prediction time point that is predicted by the power-running/regenerative electric power predicting unit, and the passenger load factor at or after the prediction time point that is predicted by the vehicle condition predicting unit; and an air conditioning controller that controls an output of the air conditioner on the basis of the output command value for the air conditioner that is calculated by the air conditioning output calculating unit. The air conditioning output calculating unit corrects the output command value for the air conditioner on the basis of the power-running/regenerative electric power that is detected by the vehicle condition detector, the power-running/regenerative electric power at or after the prediction time point that is predicted by the power-running/regenerative electric power predicting unit, and the passenger load factor at or after the prediction time point that is predicted by the vehicle condition predicting unit.

Effects of the Invention

The vehicle air conditioning control device according to the present invention allows the operation control for the air conditioner with consideration given not only to the vehicle interior comfort but also to the energy saving and the power saving. Thus, the vehicle air conditioning control device capable of adequate air conditioning control from the comprehensive viewpoint of the energy saving, the power saving, and the vehicle interior comfort is provided.

These and other objects, features, aspects and advantages of the present invention will become more apparent from the

BRIEF DESCRIPTION OF DRAWINGS

FIG. 4 A graph showing a correction function of an output command value Qs [W] for an air conditioner 6 with power-running/regenerative electric power P [kW] according to the embodiment 1 of the present invention.

FIG. 5 A graph showing a correction function of the output command value Qs [W] for the air conditioner 6 with a sum total ΣPf [kWh] of the power-running/regenerative electric power for a predetermined period of time according to the embodiment 1 of the present invention.

FIG. 8 A graph showing a correction function of the output command value Qs [W] for the air conditioner 6 with a feeding voltage according to the embodiment 2 of the present invention.

DESCRIPTION OF EMBODIMENTS

Embodiment 1

Figure 1:
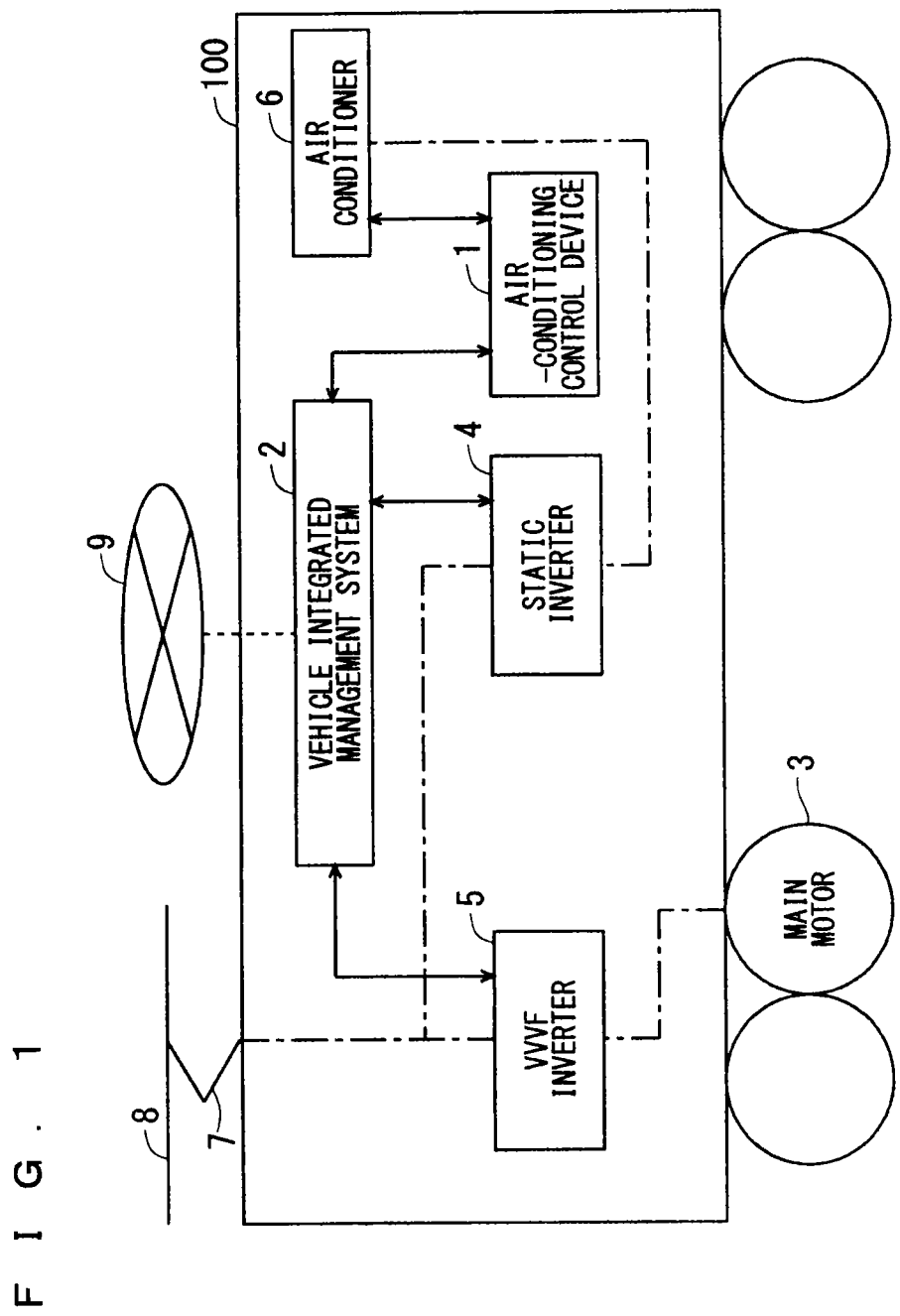
FIG. 1 A block diagram showing a configuration of a vehicle 100 including a vehicle air conditioning control device 1 according to an embodiment 1 of the present invention.

FIG. 1 is a block diagram showing a configuration of a vehicle 100 including a vehicle air conditioning control device 1 according to an embodiment 1 of the present invention. The vehicle 100 includes the vehicle air conditioning control device (hereinafter also referred to simply as "air conditioning control device") 1, a vehicle integrated management system 2, a main motor 3, a static inverter 4, a variable voltage variable frequency (VVVF) inverter 5, an air conditioner 6, and a pantograph 7. In FIG. 1, the transmission and receipt of information is indicated by a solid arrow or a broken line and the transmission and receipt of electric power is indicated by alternate long and short dashed lines.

The vehicle integrated management system 2 integrally manages controls for the vehicle 100 including the motor control, the brake control, the door control, the air conditioning control, the lighting control, the in-train guide control, and the destination guide control. The vehicle integrated management system 2 integrally manages controls for the vehicle 100 by communicating with other devices in the vehicle 100. FIG. 1 shows, as part of the communication between the vehicle integrated management system 2 and other devices in the vehicle 100, the communication with each of the static inverter 4, the VVVF inverter 5, and the air conditioning control device 1.

In addition, the vehicle integrated management system 2 is capable of communicating with, for example, stations, a vehicle management department, and other vehicles through a communications network 9. The vehicle integrated management system 2 includes, for example, a processor such as a central processing unit (CPU for short) and a memory device such as a dynamic random access memory (DRAM for short) and a hard disk device.

The main motor 3 is the main electric motor that drives the vehicle 100. The static inverter 4 is the electric power converter that supplies auxiliary power source for use in, for example, the air conditioning and the lighting of the vehicle 100. The VVVF inverter 5 is the inverter capable of varying frequency and voltage. The VVVF inverter 5 is the electric power converter that controls the electric power for driving the main motor 3 of the vehicle 100. The static inverter 4 and the VVVF inverter 5 acquire electric power from a feeder 8 through the pantograph 7.

The air conditioner 6 includes: an outdoor unit equipped with a compressor, a ventilation fan, and a heat exchanger; an indoor unit equipped with a ventilation fan and a heat exchanger; an air pipe; and an refrigerant pipe. The air conditioner 6 is controlled in accordance with output commands transmitted from the air conditioning control device 1.

The air conditioning control device 1, which is included in the vehicle 100, controls the air conditioner 6 in the vehicle 100. The air conditioning control device 1 transmits output commands to the air conditioner 6 on the basis of various information on the vehicle 100 provided by the vehicle integrated management system 2. The air conditioning control device 1 includes, for example, a processor such as a CPU and a memory device such as a DRAM and a hard disk device. In the following description, a plurality of vehicles 100 connected to each other to form a unit is referred to as a "train."

Figure 2:
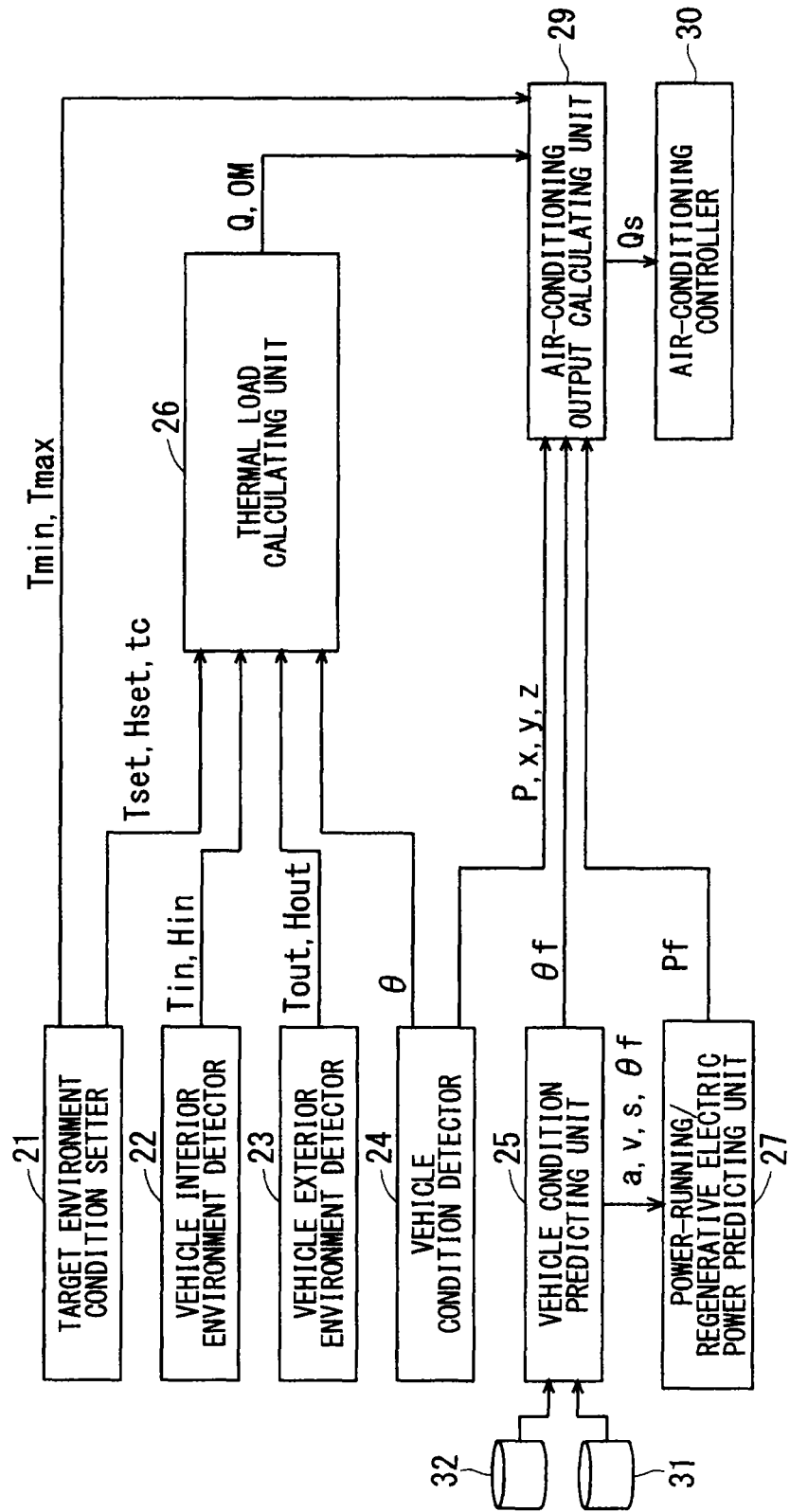
FIG. 2 A block diagram showing a configuration of the air conditioning control device 1 according to the embodiment 1 of the present invention.

FIG. 2 is a block diagram showing a configuration of the air conditioning control device 1 according to the embodiment 1 of the present invention. The air conditioning control device 1 includes a target environment condition setter 21, a vehicle interior environment detector 22, a vehicle exterior environment detector 23, a vehicle condition detector 24, a vehicle condition predicting unit 25, a thermal load calculating unit 26, a power-running/regenerative electric power predicting unit 27, an air conditioning output calculating unit 29, an air conditioning controller 30, a past passenger-load-factor database 31, and a travel plan database 32.

The target environment condition setter 21 is the means for inputting target environment conditions. The target environment conditions are the conditions targeted as the vehicle interior environment, which is the environment of the inside of the vehicle 100. The target environment conditions include a vehicle-interior-temperature set value Tset, a vehicle-interior-temperature lower-limit value Tmin, and a vehicle-interior-temperature upper-limit value Tmax. In the present embodiment, the target environment conditions further include a vehicle-interior-humidity set value Hset and a target settling time tc.

The vehicle-interior-temperature set value Tset is the predetermined value of temperature to be reached by the vehicle interior temperature, which is the temperature in the vehicle 100. The vehicle-interior-humidity set value Hset is the predetermined value of humidity to be reached by the vehicle interior humidity, which is the humidity in the vehicle 100. The vehicle-interior-temperature lower-limit value Tmin is the lower-limit value of the temperature range acceptable as the vehicle interior temperature. The vehicle-interior-temperature upper-limit value Tmax is the upper-limit value of the temperature range acceptable as the vehicle interior temperature.

The target settling time tc is targeted as the time required for the detected vehicle interior temperature to attain the vehicle-interior-temperature set value Tset. In the present embodiment, the target settling time tc is also targeted as the time required for the detected vehicle interior humidity to attain the vehicle-interior-humidity set value Hset.

The target environment condition setter 21 is equipped with, for example, an input unit including a monitor, a keyboard, and a mouse, which are not shown in the drawings. The target environment condition setter 21 is configured such that the input unit inputs the target environment conditions. In particular, the target environment condition setter 21 is configured such that the input unit inputs each of the vehicle-interior-temperature set value Tset, the vehicle-interior-humidity set value Hset, the vehicle-interior-temperature lower-limit value Tmin, the vehicle-interior-temperature upper-limit value Tmax, and the target settling time tc.

The target environment condition setter 21 provides the thermal load calculating unit 26 with the vehicle-interior-temperature set value Tset, the vehicle-interior-humidity set value Hset, and the target settling time tc that are input by the input unit. The target environment condition setter 21 provides the air conditioning output calculating unit 29 with the vehicle-interior-temperature lower-limit value Tmin and the vehicle-interior-temperature upper-limit value Tmax that are input by the input unit.

The vehicle interior environment detector 22 detects the vehicle interior environment. The vehicle interior environment includes the vehicle interior temperature and the vehicle interior humidity. The vehicle interior environment detector 22 includes, for example, a vehicle interior temperature sensor and a vehicle interior humidity sensor. In the vehicle interior environment detector 22, the vehicle interior temperature sensor detects a vehicle interior temperature Tin and the vehicle interior humidity sensor detects a vehicle interior humidity Hin. The vehicle interior environment detector 22 provides the thermal load calculating unit 26 with, as the vehicle interior environment, the vehicle interior temperature Tin and the vehicle interior humidity Hin that are detected.

The vehicle exterior environment detector 23 detects the vehicle exterior environment, which is the environment outside the vehicle 100. The vehicle exterior environment includes the vehicle exterior temperature, which is the temperature of the outside of the vehicle 100. In the present embodiment, the vehicle exterior environment further includes the vehicle exterior humidity, which is the humidity outside the vehicle 100.

The vehicle exterior environment detector 23 includes, for example, a vehicle exterior temperature sensor and a vehicle exterior humidity sensor. In the vehicle exterior environment detector 23, the vehicle exterior temperature sensor detects a vehicle exterior temperature Tout and the vehicle exterior humidity sensor detects a vehicle exterior humidity Hout. The vehicle exterior environment detector 23 provides the thermal load calculating unit 26 with, as the vehicle exterior environment, the vehicle exterior temperature Tout and the vehicle exterior humidity Hout that are detected.

The vehicle condition detector 24 detects the vehicle conditions, which are the conditions of the vehicle 100. The vehicle conditions include a position (x, y, and z) of the vehicle 100, a passenger load factor θ of the vehicle 100, and power-running/regenerative electric power P of the vehicle 100. The power-running/regenerative electric power P of the vehicle 100 is the power consumption of the main motor 3 of the train to which the vehicle 100 belongs.

The vehicle condition detector 24 includes, for example, a position sensor, a load compensation sensor, and an electric power sensor. In the vehicle condition detector 24, the position sensor detects the position (x, y, and z) of the vehicle 100. X, y, and z indicate, for example, the latitude, the longitude, and the altitude, respectively.

The vehicle condition detector 24 detects the passenger load factor θ of the vehicle 100 through the load compensation sensor. In particular, the vehicle condition detector 24 computes the passenger load factor θ as described below. In the vehicle condition detector 24, the load compensation sensor detects the weight of the vehicle 100, and the number of passengers is computed from the weight of the vehicle 100 detected by the load compensation sensor assuming that the body weight per passenger is, for example, 65 kg. The vehicle condition detector 24 computes, as the passenger load factor θ, the ratio of the computed number of passengers to the predetermined passenger capacity of the vehicle 100.

The vehicle condition detector 24 detects, through the electric power sensor, the power consumption of the main motor 3 of the train to which the vehicle 100 belongs, in other words, the power-running/regenerative electric power P. The power sensor indicates a positive value as the power consumption P during power running and indicates a negative value as the power consumption P during regeneration.

The vehicle condition detector 24 provides the thermal load calculating unit 26 with the passenger load factor θ that is detected. The vehicle condition detector 24 provides the air conditioning output calculating unit 29 with the position (x, y, and z) and the power-running/regenerative electric power P of the vehicle 100 that are detected. The vehicle condition detector 24 causes the past passenger-load-factor database 31 to store the passenger load factor θ that is detected. The past passenger-load-factor database 31 is organized under the categories including days of the week, times of day, and vehicle types such as limited express trains, express trains, and local trains.

The thermal load calculating unit 26 calculates a vehicle interior thermal load Q, for example, from the vehicle interior temperature Tin and the vehicle interior humidity Hin that are provided by the vehicle interior environment detector 22, from the vehicle exterior temperature Tout and the vehicle exterior humidity Hout that are provided by the vehicle exterior environment detector 23, from the passenger load factor θ that is provided by the vehicle condition detector 24, and from the vehicle-interior-temperature set value Tset, the vehicle-interior-humidity set value Hset, and the target settling time tc that are provided by the target environment condition setter 21. The thermal load calculating unit 26 provides the air conditioning output calculating unit 29 with the vehicle interior thermal load Q that is calculated.

The thermal load calculating unit 26 determines an operation mode (OM for short) of the air conditioner 6 on the basis of the vehicle interior temperature Tin, the vehicle interior humidity Hin, the vehicle-interior-temperature set value Tset, and the vehicle-interior-humidity set value Hset, and provides the air conditioning output calculating unit 29 with the operation mode (OM) that is determined. The air conditioner 6 has the operation modes including a cooling mode and a dehumidification mode.

The vehicle condition predicting unit 25 predicts the acceleration at or after the prediction time point, the velocity at or after the prediction time point, the slope at or after the prediction time point, and the passenger load factor at or after the prediction time point of the vehicle 100 on the basis of a travel plan of the vehicle 100 and passenger-load-factor information indicating the past passenger load factor of the vehicle 100. The "prediction time point" means the time point at which the prediction is performed. In a case where the prediction is performed at a time t, the acceleration at or after the prediction time point is the acceleration at or after the time t.

In particular, the vehicle condition predicting unit 25 predicts a passenger load factor θf at or after the prediction time point on the basis of the passenger-load-factor information of the vehicle 100, such as the statistical data on the passenger load factor. The first letter "f" of the word "future" is affixed to the sign "θ" to distinguish the passenger load factor predicted by the vehicle condition predicting unit 25 from the passenger load factor θ detected by the vehicle condition detector 24.

The statistical data on the passenger load factor, which is the passenger-load-factor information, is, for example, the past passenger load factor stored in the past passenger-load-factor database 31. For example, the vehicle condition predicting unit 25 reads the past passenger load factor stored in the past passenger-load-factor database 31 and predicts the passenger load factor θf at or after the prediction time point on the basis of the past passenger load factor that is read. The vehicle condition predicting unit 25 provides the air conditioning output calculating unit 29 with the passenger load factor θf at or after the prediction time point that is predicted. The passenger-load-factor information may be the past passenger load factor itself or the information indicating the past passenger load factor.

The vehicle condition predicting unit 25 predicts an acceleration a at or after the prediction time point, a velocity v at or after the prediction time point, and a slope s at or after the prediction time point of the vehicle 100 on the basis of, for example, the travel plan of the vehicle 100 obtained from the travel plan database 32 of the train to which the vehicle 100 belongs. The vehicle condition predicting unit 25 provides the power-running/regenerative electric power predicting unit 27 with the acceleration a at or after the prediction time point, the velocity v at or after the prediction time point, the slope s at or after the prediction time point, and the passenger load factor θf at or after the prediction time point of the vehicle 100 that are predicted.

The power-running/regenerative electric power predicting unit 27 predicts power-running/regenerative electric power Pf at or after the prediction time point, for example, on the basis of the acceleration a at or after the prediction time point, the velocity v at or after the prediction time point, the slope s at or after the prediction time point, and the passenger load factor θf at or after the prediction time point of the vehicle 100 that are provided by the vehicle condition predicting unit 25. The first letter "f" of the word "future" is affixed to the sign "P" to distinguish the power-running/regenerative electric power predicted by the power-running/regenerative electric power predicting unit 27 from the power consumption P detected by the vehicle condition detector 24. The power-running/regenerative electric power predicting unit 27 provides the air conditioning output calculating unit 29 with the power-running/regenerative electric power Pf at or after the prediction time point that is predicted.

The air conditioning output calculating unit 29 calculates an output command value Qs for the air conditioner 6 on the basis of the vehicle interior thermal load Q that is provided by the thermal load calculating unit 26, of the power-running/regenerative electric power P of the vehicle 100 that is provided by the vehicle condition detector 24, of the passenger load factor θf at or after the prediction time point that is provided by the vehicle condition predicting unit 25, of the power-running/regenerative electric power Pf at or after the prediction time point that is provided by the power-running/regenerative electric power predicting unit 27, and of the vehicle-interior-temperature lower-limit value Tmin and the vehicle-interior-temperature upper-limit value Tmax that are provided by the target environment condition setter 21. The output command value Qs for the conditioner 6 is indicated by the output command from the air conditioning controller 30 as the value to be output by the air conditioner 6.

According to the present embodiment, the air conditioning output calculating unit 29 calculates the output command value Qs for the air conditioner 6, for example, on the basis of the passenger load factor θ, the position (x, y, and z) of the vehicle 100, and the power-running/regenerative electric power P that are provided by the vehicle condition detector 24, of the vehicle interior thermal load Q and the operation mode (OM) of the air conditioner 6 that are provided by the thermal load calculating unit 26, of the passenger load factor θf at or after the prediction time point that is provided by the vehicle condition predicting unit 25, of the power-running/regenerative electric power Pf at or after the prediction time point that is provided by the power-running/regenerative electric power predicting unit 27, and of the vehicle-interior-temperature lower-limit value Tmin and the vehicle-interior-temperature upper-limit value Tmax that are provided by the target environment condition setter 21. The air conditioning output calculating unit 29 provides the air conditioning controller 30 with the output command value Qs for the air conditioner 6 that is calculated.

The air conditioning controller 30 controls the output of the air conditioner 6 on the basis of, for example, the output command value Qs for the air conditioner 6 that is provided by the air conditioning output calculating unit 29.

Figure 3:
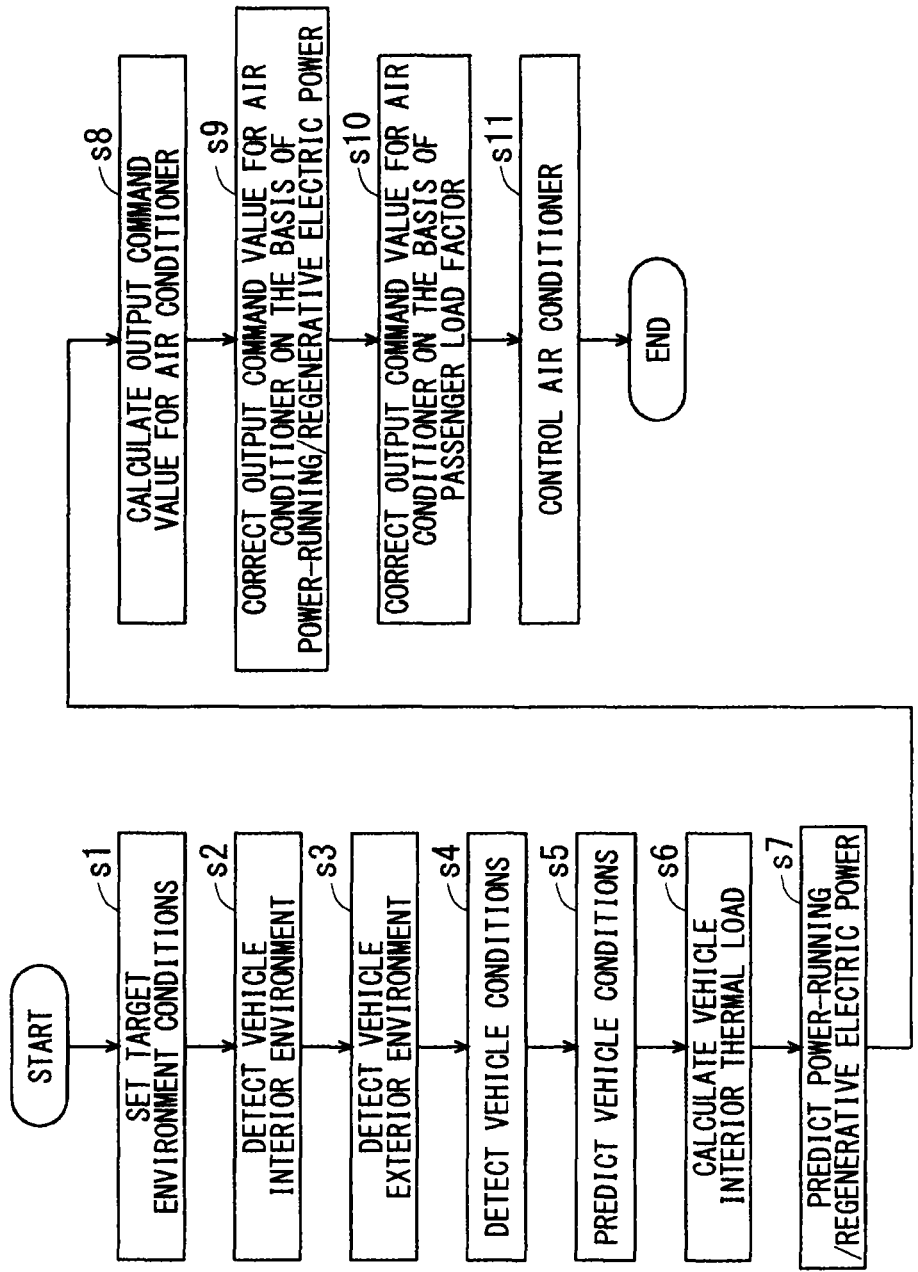
FIG. 3 A flowchart showing procedures of the air conditioning processing by the air conditioning control device 1 according to the embodiment 1 of the present invention.

FIG. 3 is a flowchart showing procedures of the air conditioning processing by the air conditioning control device 1 according to the embodiment 1 of the present invention. According to the present embodiment, the following describes the operation of the air conditioning control device 1 in cooling or dehumidifying the vehicle 100 as an example of the operation of the air conditioning control device 1 in the air conditioning processing. Each part of the processing in the flowchart shown in FIG. 3 is executed by one of the component units of the air conditioning control device 1. The processing in the flowchart shown in FIG. 3 starts when the air conditioning control device 1 is supplied with electric power, and then moves on to Step s1.

In Step s1, the target environment condition setter 21 sets the target environment conditions. In particular, the target environment condition setter 21 inputs the vehicle-interior-temperature set value Tset [° C.], the vehicle-interior-humidity set value Hset [%], the vehicle-interior-temperature lower-limit value Tmin [° C.], the vehicle-interior-temperature upper-limit value Tmax [° C.], and the target settling time tc [sec] through the input unit including the monitor, the keyboard, and the mouse.

The vehicle-interior-temperature set value Tset [° C.] is, for example, 27 [° C.]. The vehicle-interior-humidity set value Hset [%] is, for example, 60 [%]. The vehicle-interior-temperature lower-limit value Tmin [° C.] is, for example, 24 [° C.]. The vehicle-interior-temperature upper-limit value Tmax [° C.] is, for example, 30 [° C.]. The target settling time tc [sec] is, for example, 60 [sec].

In Step s2, the vehicle interior environment detector 22 detects the vehicle interior environment. In particular, the vehicle interior environment detector 22 detects the vehicle interior temperature Tin [° C.] through the vehicle interior temperature sensor and detects the vehicle interior humidity Hin [%] through the vehicle interior humidity sensor.

In Step s3, the vehicle exterior environment detector 23 detects the vehicle exterior environment. In particular, the vehicle exterior environment detector 23 detects the vehicle exterior temperature Tout [° C.] through the vehicle exterior temperature sensor and detects the vehicle exterior humidity Hout [%] through the vehicle exterior humidity sensor.

In Step s4, the vehicle condition detector 24 detects the vehicle conditions. In particular, the vehicle condition detector 24 detects the position (x, y, and z) of the vehicle 100 through the position sensor, detects the passenger load factor θ through the load compensation sensor, and detects the power consumption of the main motor 3 of the train to which the vehicle 100 belongs, in other words, the power-running/regenerative electric power P [kW], through the electric power sensor.

In Step s5, the vehicle condition predicting unit 25 predicts the vehicle conditions at or after the prediction time point. In particular, the vehicle condition predicting unit 25 reads the past passenger load factor from the past passenger-load-factor database 31 and predicts the passenger load factor θf at or after the prediction time point on the basis of the past passenger load factor that is read. The vehicle condition predicting unit 25 predicts the acceleration a [1 cm/h/s] at or after the prediction time point, the velocity v [km/h] at or after the prediction time point, and the slope s [%] at or after the prediction time point of the vehicle 100 on the basis of the travel plan obtained from the travel plan database 32 of the train to which the vehicle 100 belongs.

In Step s6, the thermal load calculating unit 26 calculates the vehicle interior thermal load Q. In particular, the thermal load calculating unit 26 calculate the vehicle interior thermal load Q [W] from the vehicle interior temperature Tin [° C.], the vehicle interior humidity Hin [%], the vehicle exterior temperature Tout [° C.], the vehicle exterior humidity Hout [%], the passenger load factor θ, the vehicle-interior-temperature set value Tset [° C.], the vehicle-interior-humidity set value Hset [%], and the target setting time tc [s].

The vehicle interior thermal load Q [W] is obtained from Expression (1) described below. According to Expression (1), a vehicle interior heat quantity Qin [Ws], which needs to be removed to attain the vehicle-interior-temperature set value and the vehicle-interior-humidity set value, is removed from the vehicle interior temperature and the vehicle interior humidity over the target settling time tc [s]. The amount of heat transferred from outside is represented by Qtrans [W], the amount of heat inflow caused by opening of the doors is represented by Qex [W], and the amount of heat emanating from passengers is represented by Qpas [W].

$$Q = Q\text{in}/tc + Q\text{trans} + Q\text{ex} + Q\text{pas} \quad (1)$$

The vehicle interior heat quantity Qin [Ws] included in Expression (1) is obtained from Expression (2) described below that includes a vehicle interior specific enthalpy Ein [J/kg], a target specific enthalpy Eset [J/kg], a vehicle interior volumetric capacity Vin [m³], and an air density ρ [kg/m³]. The vehicle interior specific enthalpy Ein [J/kg] is computed from the vehicle interior temperature Tin [° C.] and the vehicle interior humidity Hin [%]. The target specific enthalpy Eset [J/kg] is computed from the vehicle-interior-temperature set value Tset [° C.] and the vehicle-interior-humidity set value Hset [%].

$$Q\text{in} = V\text{in} \times \rho \times (E\text{in} - E\text{set}) \quad (2)$$

The amount of heat Qtrans [W] transferred from outside that is included in Expression (1) is obtained from Expression (3) described below in which α [W/m²·K] represents the heat transfer coefficient of the vehicle body and A [m²] represents the heat transmission area of the vehicle body.

$$Q\text{trans} = A \times \alpha \times (T\text{out} - T\text{in}) \quad (3)$$

The amount of heat inflow Qex [W] caused by opening of the doors that is included in Expression (1) is obtained from Expression (4) described below in which Vex [m³/s] represents the air volume exchanged between the inside and outside per unit time.

$$Q\text{ex} = V\text{ex} \times \rho \times (E\text{out} - E\text{in}) \quad (4)$$

The amount of heat Qpas [W] emanating from passengers that is included in Expression (1) is obtained from Expression (5) described below in which Qman [W/person] represents the amount of emanated heat per person per unit time and Mmax [person] represents the passenger capacity of the vehicle 100.

$$Q\text{pas} = \theta \times M\text{max} \times Q\text{man} \quad (5)$$

In Step s6, the thermal load calculating unit 26 calculates the vehicle interior thermal load Q as described above and determines whether the vehicle interior dehumidification is necessary to keep the vehicle interior comfort on the basis of the vehicle interior temperature Tin [° C.], the vehicle interior humidity Hin [%], the vehicle-interior-temperature set value Tset [° C.], and the vehicle-interior-humidity set value Hset [%].

When no need for dehumidification is determined, the thermal load calculating unit 26 provides the air conditioning output calculating unit 29 with the command to operate the air conditioner 6 in the cooling mode along with the thermal load Q [W] that is calculated. When the need for dehumidification is determined, the thermal load calculating unit 26 provides the air conditioning output calculating unit 29 with the command to operate the air conditioner 6 in the dehumidification mode along with the thermal load Q [W] that is calculated.

For example, the operation mode may be determined in such a manner that: a difference or a ratio is obtained by comparing the vehicle-interior absolute humidity [g] computed from the vehicle interior temperature Tin [° C.] and the vehicle interior humidity Hin [%] with the vehicle-interior absolute-humidity set value [g] computed from the vehicle-interior-temperature set value Tset [° C.] and the vehicle-interior-humidity set value Hset [%]; the cooling mode is selected when the difference or the ratio is less than the predetermined value; and the dehumidification mode is selected when the difference or the ratio is equal to or more than the predetermined value. The absolute humidity can be computed through the use of, for example, a psychrometric chart.

In Step s7, the power-running/regenerative electric power predicting unit 27 predicts the power-running/regenerative electric power Pf at or after the prediction time point. In particular, the power-running/regenerative electric power predicting unit 27 predicts the power-running/regenerative electric power Pf [kW] at or after the prediction time point from the acceleration a [km/h/s] at or after the prediction time point, the velocity v [km/h] at or after the prediction time point, the slope s [%] at or after the prediction time point, and the passenger load factor θf at or after the prediction time point of the vehicle 100 that are predicted by the vehicle condition predicting unit 25.

The power-running/regenerative electric power Pf [kW] at or after the prediction time point is, more particularly, predicted through the use of, for example, Expression (6) described below. In Expression (6), g is the function for predicting the power-running/regenerative electric power Pf [kW] at or after the prediction time point.

$$Pf=g(a,v,s,\theta f) \quad (6)$$

In Expression (6), the power-running/regenerative electric power Pf [kW] at or after the prediction time point is predicted from the four values including the acceleration a [km/h/s] at or after the prediction time point, the velocity v [km/h] at or after the prediction time point, the slope s [%] at or after the prediction time point, and the passenger load factor θf at or after the prediction time point of the vehicle 100. Alternatively, the power-running/regenerative electric power Pf [kW] at or after the prediction time point may be predicted through the use of the expression formulated in detail with consideration given to, for example, the air resistance.

In Steps s8 to s10, the air conditioning output calculating unit 29 determines the output command value Qs [W] for the air conditioner 6 on the basis of the position (x, y, and z) of the vehicle 100, the vehicle interior thermal load Q [W], the passenger load factor θf at or after the prediction time point, the power-running/regenerative electric power P [kW], the power-running/regenerative electric power Pf [kW] at or after the prediction time point, the vehicle-interior-temperature lower-limit value Tmin [° C.], and the vehicle-interior-temperature upper-limit value Tmax [° C.].

Firstly, in Step s8, the air conditioning output calculating unit 29 calculates the output command value Qs [W] for the air conditioner 6 in accordance with Qs=h (Q) and sets the operation mode of the air conditioner 6 that agrees with the operation mode determined in Step s6, particularly, with the cooling mode or the dehumidification mode. In the above expression, h is the function for calculating the output command value Qs for the air conditioner 6 and, for example, the function h is defined such that Qs is equal to Q.

Next, in Steps s9 and s10 described below, the air conditioning output calculating unit 29 corrects the output command value Qs [W] for the air conditioner 6 that is calculated in Step s8. In Step s9, the air conditioning output calculating unit 29 corrects the output command value Qs [W] for the air conditioner 6 on the basis of the power-running/regenerative electric power P [kW]. In the present embodiment, during power running, the air conditioning output calculating unit 29 performs the processing for correcting the output command value Qs [W] such that the output of the air conditioner 6 decreases. During regeneration, the air conditioning output calculating unit 29 performs the processing for correcting the output command value Qs [W] such that the output of the air conditioner 6 increases.

FIG. 4 is a graph showing a correction function of the output command value Qs [W] for the air conditioner 6 with the power-running/regenerative electric power P [kW] according to the embodiment 1 of the present invention. In FIG. 4, the axis of abscissas indicates the power-running/regenerative electric power P [kW] and the axis of ordinates indicates the output command value Qs [W] for the air conditioner 6.

Assuming that the vehicle interior temperature Tin [° C.] falls within the predetermined acceptable range, particularly, within the range of the vehicle-interior-temperature lower-limit value Tmin [° C.] inclusive to the vehicle-interior-temperature upper-limit value Tmax [° C.] inclusive, in a case where the power-running/regenerative electric power P [kW] indicates a positive value for power running, the air conditioning output calculating unit 29 corrects the output command value Qs [W] for the air conditioner 6 in accordance with Qs×h1 (P). As shown by the broken line in FIG. 4, h1 is the function indicating a monotone decrease to the lower limit of 0.

Meanwhile, in a case where the power-running/regenerative electric power P [kW] indicates a negative value for regeneration, the air conditioning output calculating unit 29 corrects the output command value Qs [W] for the air conditioner 6 in accordance with Qs×h2 (P). As shown by the solid line in FIG. 4, h2 is the function indicating a monotone decrease.

When the output command value Qs [W] for the air conditioner 6 exceeds a maximum output Qsmax [W] of the air conditioner 6, the output command value Qs [W] for the air conditioner 6 is maximized, or in other words, is set at the maximum output Qsmax [W] of the air conditioner 6.

The air conditioning output calculating unit 29 corrects the output command value Qs [W] for the air conditioner 6 on the basis of the power-running/regenerative electric power Pf [kW] at or after the prediction time point. According to the present embodiment, for the power running predicted ahead, the air conditioning output calculating unit 29 performs the processing for correcting the output command value Qs [W] such that the output of the air conditioner 6 increases. For the regeneration predicted ahead, the air conditioning output calculating unit 29 performs the processing for correcting the output command value Qs [W] such that the output of the air conditioner 6 decreases.

FIG. 5 is a graph showing a correction function of the output command value Qs [W] for the air conditioner 6 with a sum total ΣPf [kWh] of power-running/regenerative electric power for a predetermined period of time according to the embodiment 1 of the present invention. In FIG. 5, the axis of abscissas indicates the sum total ΣPf [kWh] of power-running/regenerative electric power and the axis of ordinates indicates the output command value Qs [W] for the air conditioner 6.

Although the output command value Qs [W] for the air conditioner 6 is barely corrected on the basis of the power-running/regenerative electric power P [kW] described above during, for example, the coasting and the stopping of the train without generation of power-running/regenerative electric power, the following processing is performed in a case where the power running or the regeneration is predicted ahead. In a case where the power-running/regenerative electric power Pf [kW] at or after the prediction time point indicates a positive value for power running for some time, for example, 30 seconds or more within a period of time starting immediately after departure and extending up to 60 seconds, the air conditioning output calculating unit 29 corrects the output command value Qs [W] for the air conditioner 6 in accordance with h3 (ΣPf)×Qs. The ΣPf [kWh] represents the sum total of the power-running/regenerative electric power during such period of time. As shown by the broken line in FIG. 5, h3 is the function indicating a monotonous increase from the lower limit of 1.

In a case where the power-running/regenerative electric power Pf [kW] at or after the prediction time point indicates a negative value for regeneration for some time, for example, 30 seconds or more within a period of time starting immediately after departure and extending up to 60 seconds, the output command value Qs [W] for the air conditioner 6 is corrected in accordance with h4 (ΣPf)×Qs. Note that the ΣPf [kWh] represents the sum total of the power-running/regenerative electric power during such period of time. As shown by the solid line in FIG. 5, h4 is the function indicating a monotonous increase to the upper limit of 1.

When the output command value Qs [W] for the air conditioner 6 exceeds the maximum output Qsmax [W] of the air conditioner 6, the output command value Qs [W] for the air conditioner 6 is maximized, or in other words, is set at the maximum output Qsmax [W] of the air conditioner 6.

Although Step s9 refers to the correction of the output command value Qs [W] for the air conditioner 6 by the multiplication, the correction method is not limited thereto. For example, during power running, the output command value Qs [W] for the air conditioner 6 may be subjected to the subtraction processing as the power-running electric power increases from the lower limit of 0. During regeneration, the output command value Qs [W] for the air conditioner 6 may be subjected to the addition processing as the regenerative electric power increases. The output command value Qs [W] for the air conditioner 6 is not corrected in Step s9 unless the vehicle interior temperature Tin [° C.] falls within the range of the vehicle-interior-temperature lower-limit value Tmin [° C.] inclusive to the vehicle-interior-temperature upper-limit value Tmax [° C.] inclusive.

For the power running to be continued for some time to come as in the case of a series of upward slopes, the processing in Step s9 provides the advance cooling during the coasting and the stopping, or in other words, increases air conditioning output, thereby allowing power saving for the electric power peak during power running. For the regeneration to be continued for some time to come as in the case of a series of downward slopes, the processing in Step s9 avoids excessive cooling during the coasting and the stopping, or in other words, decreases air conditioning output, thereby recovering greater regenerative electric power during regeneration and thus saving energy.

In Step s10, the air conditioning output calculating unit 29 corrects the output command value Qs [W] for the air conditioner 6 on the basis of the passenger load factor θf at or after the prediction time point. For example, assuming that the vehicle interior temperature Tin [° C.] falls within the predetermined acceptable range, particularly, within the range of the vehicle-interior-temperature lower-limit value Tmin [° C.] inclusive to the vehicle-interior-temperature upper-limit value Tmax [° C.] inclusive, the air conditioning output calculating unit 29 computes a time tr [s] from the arrival in the next station to the completion of boarding and alighting of passengers (hereinafter also referred to as "boarding-and-alighting completion time") on the basis of the position (x, y, and z) of the vehicle 100.

The air conditioning output calculating unit 29 performs the following processing when the boarding-and-alighting completion time tr [s] obtained by the computation is less than a predetermined set value trmax [sec], which is, for example, 60 seconds. Thus, in a case where an example of the passenger load factor θf at or after the prediction time point, such as θnext (referred to as "next-station passenger load factor") that is the passenger load factor from the departure from the next station to the arrival in the station after next, is smaller than the passenger load factor θ, the output command value Qs [W] for the air conditioner 6 is obtained from Expression (7) described below, whereby the output of the air conditioner 6 is reduced. In Expression (7), θmax represents the maximum value of the passenger load factor of the vehicle 100.

$$Qs=Qs\times\{1-(\theta-\theta next)/\theta max\} \quad (7)$$

When the next-station passenger load factor θnext is greater than the passenger load factor θ, the output command value Qs [W] for the air conditioner 6 is obtained from Expression (8) described below, whereby the output of the air conditioner 6 is increased.

$$Qs=Qs\times\{1+(\theta next-\theta)/\theta max\} \quad (8)$$

In Step s10, as described above, the output command value Qs [W] for the air conditioner 6 is corrected on the basis of the example of the passenger load factor θf at or after the prediction time point, such as the next-station passenger load factor θnext. This improves the vehicle interior comfort at the time of arrival in the next station. The output command value Qs [W] for the air conditioner 6 is not corrected in Step s10 unless the vehicle interior temperature Tin [° C.] falls within the range of the vehicle-interior-temperature lower-limit value Tmin [° C.] inclusive to the vehicle-interior-temperature upper-limit value Tmax [° C.] inclusive.

In Step s11, the air conditioning controller 30 controls the air conditioner 6. The air conditioning controller 30 controls the air conditioner 6 on the basis of, for example, the output command value Qs for the air conditioner 6 and the operation mode determined in Step s6. The processing in Step s11 ends, and then, the entire procedures end.

Thus, according to the present embodiment, the air conditioning output calculating unit 29 determines, in the Steps s8 to s10, the output command value Qs [W] for the air conditioner 6 on the basis of the vehicle interior thermal load Q [W], the power-running/regenerative electric power P [kW], the power-running/regenerative electric power Pf [kW] at or after the prediction time point, the passenger load factor θf at or after the prediction time point, the position (x, y, and z) of the vehicle 100, and the set temperature including the vehicle-interior-temperature lower-limit value Tmin [° C.] and the vehicle-interior-temperature upper-limit value Tmax [° C.]. Consequently, the operation control for the air conditioner 6 can be performed with consideration given not only to the vehicle interior comfort but also to the energy saving and the power saving. This provides the air conditioning control device 1 capable of adequate air conditioning control from the comprehensive viewpoint of the energy saving, the power saving, and the vehicle interior comfort.

According to the present embodiment, the vehicle exterior environment detector 23 detects, as the vehicle exterior environment, both the vehicle exterior temperature Tout and the vehicle exterior humidity Hout, and calculates the vehicle interior thermal load Q on the basis of the Tout and the Hout. Alternatively, only the vehicle exterior temperature Tout may be used as the vehicle exterior environment. The use of only the vehicle exterior temperature Tout produces the effect similar to that of the present embodiment in which both the vehicle exterior temperature Tout and the vehicle exterior humidity Hout are used.

Embodiment 2

Figure 6:
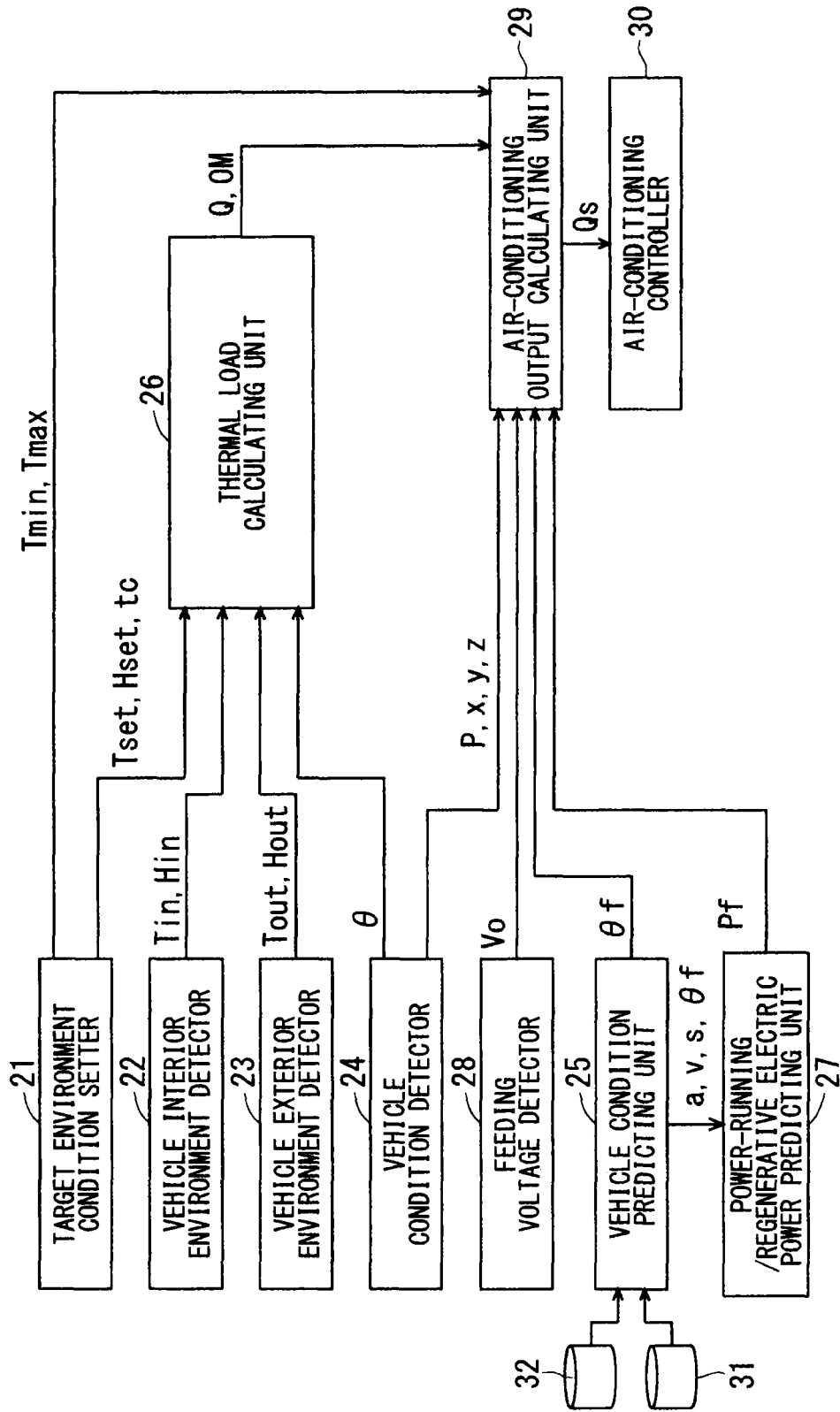
FIG. 6 A block diagram showing a configuration of an air conditioning control device 1A according to an embodiment 2 of the present invention.

FIG. 6 is a block diagram showing a configuration of an air conditioning control device 1A according to an embodiment 2 of the present invention. As the air conditioning control device 1A according to the present embodiment, the air conditioning control device 1 according to the embodiment 1 of the present invention that is shown in FIG. 2 described above further includes a feeding voltage detector 28. Similarly to the air conditioning control device 1 according to the embodiment 1, the air conditioning control device 1A according to the present embodiment is the vehicle air conditioning control device and is included in, for example, the vehicle 100 shown in FIG. 1 described above in place of the air conditioning control device 1 according to the embodiment 1. That is, the air conditioning control device 1A, which is included in the vehicle 100, controls the air conditioner 6 in the vehicle 100.

The following describes the differences between the configuration of the air conditioning control device 1A according to the embodiment 2 and the configuration of the air conditioning control device 1 according to the embodiment 1. The same reference signs indicate the configuration of the air conditioning control device 1A according to the embodiment 2 that is the same as the configuration of the air conditioning control device 1 according to the embodiment 1, and a description thereof is omitted.

The feeding voltage detector 28 includes, for example, a feeding voltage sensor. The feeding voltage detector 28 detects a feeding voltage Vo at the traveling point of the vehicle 100 through the feeding voltage sensor. The feeding voltage detector 28 provides the air conditioning output calculating unit 29 with the feeding voltage Vo that is detected.

The air conditioning output calculating unit 29 calculates the output command value Qs for the air conditioner 6, for example, on the basis of the feeding voltage Vo that is provided by the feeding voltage detector 28, of the passenger load factor θ, the position (x, y, and z) of the vehicle 100, and the power-running/regenerative electric power P that are provided by the vehicle condition detector 24, of the vehicle interior thermal load Q and the operation mode (OM) of the air conditioner 6 that are provided by the thermal load calculating unit 26, of the passenger load factor θf at or after the prediction time point that is provided by the vehicle condition predicting unit 25, of the power-running/regenerative electric power Pf at or after the prediction time point that is provided by the power-running/regenerative electric power predicting unit 27, and of the vehicle-interior-temperature lower-limit value Tmin and the vehicle-interior-temperature upper-limit value Tmax that are provided by the target environment condition setter 21. The air conditioning output calculating unit 29 provides the air conditioning controller 30 the output command value Qs for the air conditioner 6 that is calculated.

Figure 7:
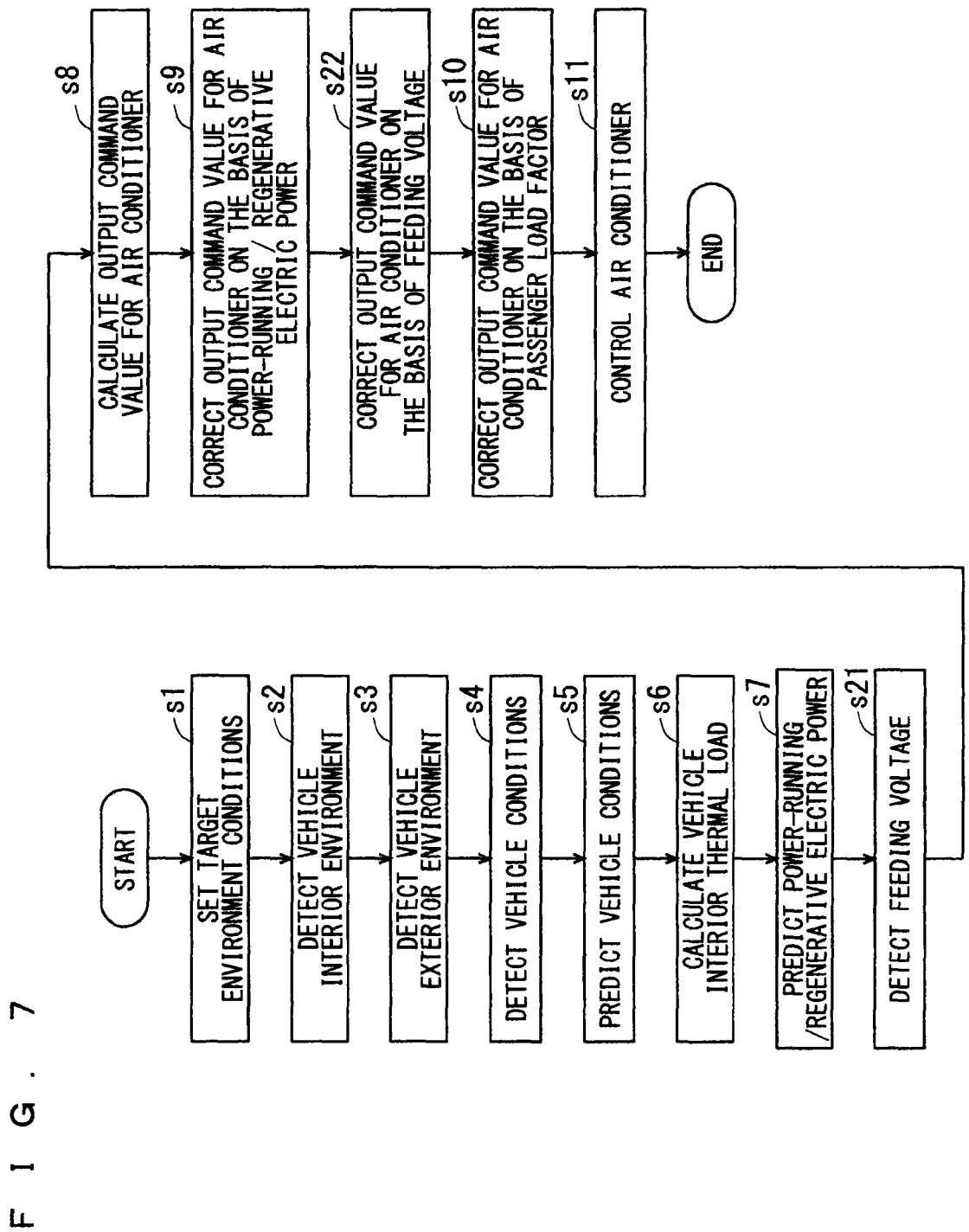
FIG. 7 A flowchart showing procedures of the air conditioning processing by the air conditioning control device 1A according to the embodiment 2 of the present invention.

FIG. 7 is a flowchart showing procedures of the air conditioning processing by the air conditioning control device 1A according to the embodiment 2 of the present invention. According to the present embodiment, the following describes the operation of the air conditioning control device 1A in cooling or dehumidifying the vehicle 100 as an example of the operation of the air conditioning control device 1A in the air conditioning processing. Each part of the processing in the flowchart shown in FIG. 7 is executed by one of the component units of the air conditioning control device 1A. The processing in the flowchart shown in FIG. 7 starts when the air conditioning control device 1A is supplied with electric power, and then moves on to Step s1.

The following describes the difference between the air conditioning processing by the air conditioning control device 1A according to the embodiment 2 and the air conditioning processing by the air conditioning control device 1 according to the embodiment 1.

In Step s21, the feeding voltage detector 28 detects the feeding voltage. In particular, the feeding voltage detector 28 detects the feeding voltage Vo [V] through the feeding voltage sensor.

In Step s22, the air conditioning output calculating unit 29 corrects the output command value Qs [W] for the air conditioner 6 on the basis of the feeding voltage Vo [V].

FIG. 8 is a graph showing a correction function of the output command value Qs [W] for the air conditioner 6 with the feeding voltage according to the embodiment 2 of the present invention. In FIG. 8, the axis of abscissas indicates the feeding voltage Vo [V] and the axis of ordinates indicates the output command value Qs [W] for the air conditioner 6.

Assuming that the vehicle interior temperature Tin [° C.] falls within the predetermined acceptable range, particularly, within the range of the vehicle-interior-temperature lower-limit value Tmin [° C.] inclusive to the vehicle-interior-temperature upper-limit value Tmax [° C.] inclusive, as shown in FIG. 8, in a case where the feeding voltage Vo [V] is smaller than a feeding-voltage lower-limit value Vomin [V], the air conditioning output calculating unit 29 sets the output command value Qs [W] for the air conditioner 6 at 0 such that the output of the air conditioner 6 turns off.

In a case where the feeding voltage Vo [V] is between the feeding-voltage lower-limit value Vomin [V] and a feeding-voltage lower reference value Voset1 [V], the air conditioning output calculating unit 29 obtains the output command value Qs [W] for the air conditioner 6 from Expression (9) described below, whereby the output of the air conditioner 6 is reduced.

$$Qs = Qs \times (Vo - Vomin)/(Voset1 - Vomin) \quad (9)$$

In a case where the feeding voltage Vo [V] is between a feeding-voltage upper reference value Voset2 [V] and a feeding-voltage upper-limit value Vomax [V], the air conditioning output calculating unit 29 obtains the output command value Qs [W] for the air conditioner 6 from Expression (10) described below, whereby the output of the air conditioner 6 is increased.

$$Qs = Qs + \{(Qs\max - Qs) \times (Vo - Voset2)/(Vo\max - Voset2)\} \quad (10)$$

In a case where the feeding voltage Vo [V] is greater than the feeding-voltage upper-limit value Vomax [V], the output command value Qs [W] for the air conditioner 6 is maximized, or in other words, is set at the maximum output Qsmax of the air conditioner 6, whereby the output of the air conditioner 6 is maximized.

In a case where the feeding voltage Vo [V] falls within the range of the feeding-voltage lower reference value Voset1 [V] inclusive to the feeding-voltage upper reference value Voset2 [V] inclusive, the air conditioning output calculating unit 29 sets the output command value Qs [W] for the air conditioner 6 at a reference value Qs_set of the output command value Qs. The reference value Qs_set of the output command value Qs is given by Expression (9) in which the feeding voltage Vo has the feeding-voltage lower reference value Voset1. The reference value Qs_set of the output command value Qs is equal to the value given by Expression (10) in which the feeding voltage Vo has the feeding-voltage upper reference value Voset2.

In Step s22, the output command value Qs [W] for the air conditioner 6 is corrected on the basis of the feeding voltage Vo [V] as described above, so that the feeding voltage Vo is prevented from deviating from the reference values Voset1 and Voset 2. The output command value Qs [W] for the air conditioner 6 is not corrected in Step s22 unless the vehicle interior temperature Tin [° C.] falls within the range of the vehicle-interior-temperature lower-limit value Tmin [° C.] inclusive to the vehicle-interior-temperature upper-limit value Tmax [° C.] inclusive.

Thus, according to the present embodiment, the output command value for the air conditioner 6 is corrected on the basis of the feeding voltage as well as of the power-running/regenerative electric power, the power-running/regenerative electric power at or after the prediction time point, and the passenger load factor at or after the prediction time point. Consequently, the operation control for the air conditioner 6 can be performed with consideration given to the vehicle interior comfort, the energy saving, and the power saving while the feeding voltage is prevented from deviating from the reference values. This provides the air conditioning control device 1A capable of more adequate air conditioning control from the comprehensive viewpoint of the energy saving, the power saving, and the vehicle interior comfort.

Embodiment 3

The embodiments 1 and 2 described above have referred to the air conditioning control devices 1 and 1A capable of performing the air conditioning control, in other words, the operation control with consideration given not only to the vehicle interior comfort but also to the energy saving and the power saving. An embodiment 3 of the present invention refers to the air conditioning control device capable of creating an air conditioning operation plan including the predictions on the changes in the vehicle interior temperature and the vehicle interior humidity after the air conditioning control and of grasping, in advance, the vehicle interior comfort, the energy saving, and the power saving.

Figure 9:
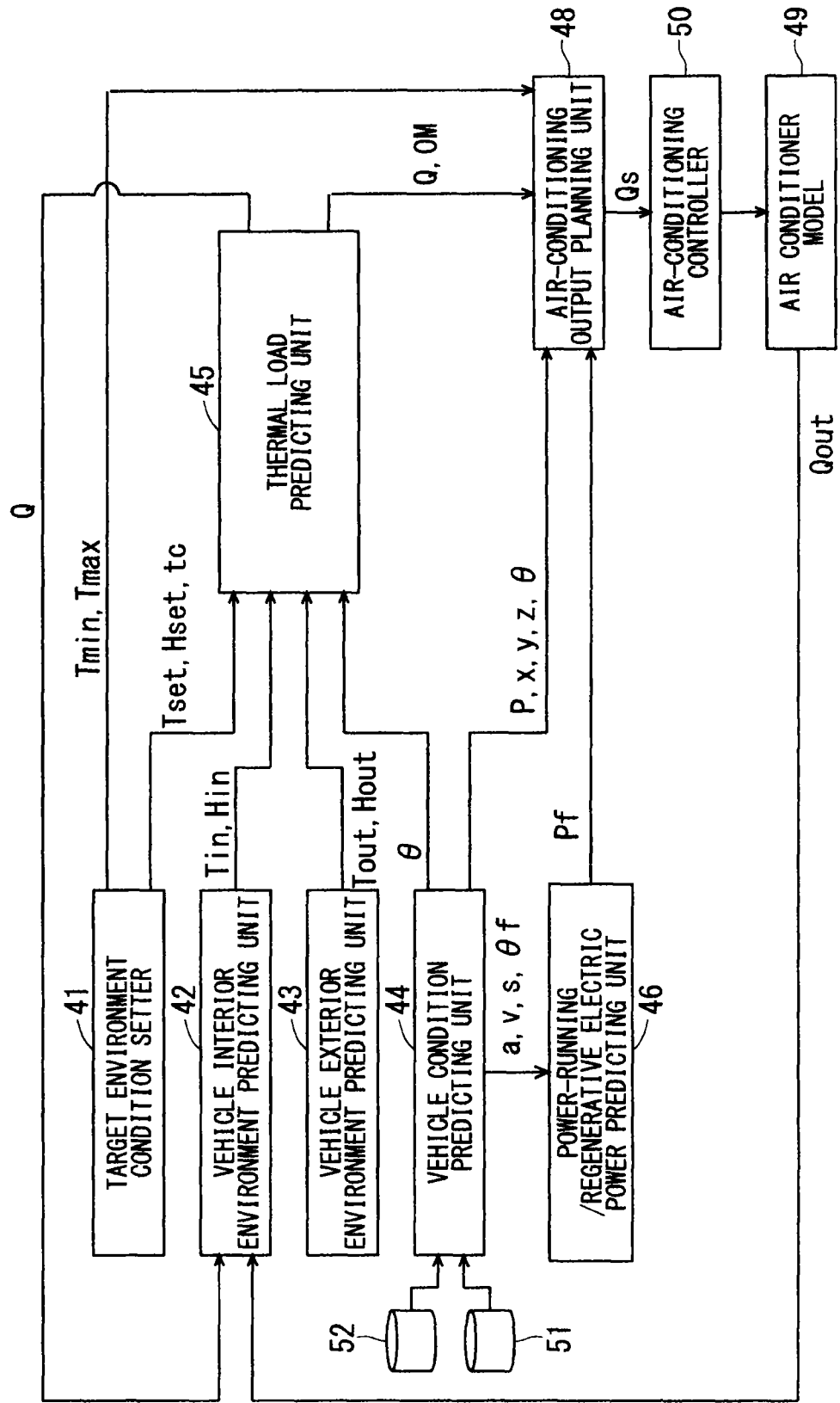
FIG. 9 A block diagram showing a configuration of an air conditioning control device 1B according to an embodiment 3 of the present invention.

FIG. 9 is a block diagram showing a configuration of an air conditioning control device 1B according to the embodiment 3 of the present invention. Similarly to the air conditioning control devices 1 and 1A according to the embodiments 1 and 2, the air conditioning control device 1B according to the present embodiment is the vehicle air conditioning control device and is included in, for example, the vehicle 100 shown in FIG. 1 described above in place of the air conditioning control device 1 according to the embodiment 1. That is, the air conditioning control device 1B, which is included in the vehicle 100, controls the air conditioner 6 in the vehicle 100.

The air conditioning control device 1B includes a target environment condition setter 41, a vehicle interior environment predicting unit 42, a vehicle exterior environment predicting unit 43, a vehicle condition predicting unit 44, a thermal load predicting unit 45, a power-running/regenerative electric power predicting unit 46, an air conditioning output planning unit 48, an air conditioner model 49, an air conditioning controller 50, a past passenger-load-factor database 51, and a travel plan database 52.

The target environment condition setter 41 is equipped with, for example, an input unit including a monitor, a keyboard, and a mouse. The target environment condition setter 41 is configured such that such that the input unit inputs each of the values at the time t including a vehicle-interior-temperature set value Tset(t), a vehicle-interior-humidity set value Hset(t), a vehicle-interior-temperature lower-limit value Tmin(t), a vehicle-interior-temperature upper-limit value Tmax(t), and a target settling time tc(t) at the time t. The sign "(t)" refers to the value at the time t, with which the time for starting the planning is counted as t=0, the next time is counted as t=1, and the time after next is counted as t=2.

The target environment condition setter 41 provides the thermal load predicting unit 45 with the vehicle-interior-temperature set value Tset(t), the vehicle-interior-humidity set value Hset(t), and the target setting time tc(t) at the time t that are input by the input unit. The target environment condition setter 41 provides the air conditioning output planning unit 48 with the vehicle-interior-temperature lower-limit value Tmin(t) and the vehicle-interior-temperature upper-limit value Tmax(t) at the time t that are input by the input unit.

The vehicle interior environment predicting unit 42 corresponds to the vehicle interior environment detector 22 according to the embodiment 1 described above that is configured to have the function of the vehicle interior environment predicting unit for predicting the vehicle interior environment. The vehicle interior environment predicting unit 42 includes, for example, a vehicle interior temperature sensor and a vehicle interior humidity sensor. The vehicle interior environment predicting unit 42 detects the vehicle interior environment under the condition of t=1 and predicts the vehicle interior environment under the condition of t>0.

In particular, under the condition of t=0, the vehicle interior environment predicting unit 42 detects, through the vehicle interior temperature sensor, a vehicle interior temperature Tin(t) at the time t=0, which is referred to as a vehicle interior temperature Tin(0). The vehicle interior environment predicting unit 42 predicts, through the vehicle interior humidity sensor, a vehicle interior humidity Hin(t) at the time t=0, which is referred to as a vehicle interior humidity Hin(0). The vehicle interior environment predicting unit 42 provides the thermal load predicting unit 45 with the vehicle interior temperature Tin(0) and the vehicle interior humidity Hin(0) that are detected. The vehicle interior temperature Tin(0) and the vehicle interior humidity Hin(0) are detected through the vehicle interior temperature sensor and the vehicle interior humidity sensor according to the above description. Alternatively, any given value may be set through, for example, an input unit including a monitor, a keyboard, and a mouse.

Under the condition of t>0, the vehicle interior environment predicting unit 42 predicts the vehicle interior temperature Tin(t) and the vehicle interior humidity Hin(t) at the time t on the basis of a thermal load Q(t−1) and an operation mode OM(t−1) that are provided by the thermal load predicting unit 45 described below and of an air conditioning load Qout(t−1) that is output by the air conditioner model 49 described below. As described below, assuming that a blow-off temperature Tac(t−1), a blow-off humidity Hac(t−1), and a blow-off flow rate Aac(t−1) are provided by the air conditioner model 49, the temperature and the humidity of mixed air can be computed from these values, a vehicle interior temperature Tin(t−1), a vehicle interior humidity Hin(t−1), and the vehicle interior volumetric capacity Vin through the use of a psychrometric chart, thereby providing predictions on the vehicle interior temperature Tin(t) and the vehicle interior humidity Hin(t) at the time t. The vehicle interior environment predicting unit 42 provides the thermal load predicting unit 45 with the vehicle interior temperature Tin(t) and the vehicle interior humidity Hin(t) at the time t that are predicted.

The vehicle exterior environment predicting unit 43 corresponds to the vehicle exterior environment detector 23 according to the embodiment 1 described above that is configured to have the function of the vehicle exterior environment predicting unit for predicting the vehicle exterior environment. The vehicle exterior environment predicting unit 43 includes, for example, a vehicle exterior temperature sensor and a vehicle exterior humidity sensor. The vehicle exterior environment predicting unit 43 detects the vehicle exterior environment under the condition of t=0 and predicts the vehicle exterior environment under the condition of t>0.

In particular, under the condition of t=0, the vehicle exterior environment predicting unit 43 detects, through the vehicle exterior temperature sensor, Tout(t) at the time t=0, which is referred to as a vehicle exterior temperature Tout (0). The vehicle exterior environment predicting unit 43 detects, through the vehicle exterior humidity sensor, a vehicle exterior humidity Hout(t) at the time t=0, which is referred to as a vehicle exterior humidity Hout(0). The vehicle exterior environment predicting unit 43 provides the thermal load predicting unit 45 with, as the vehicle exterior environment, the vehicle exterior temperature Tout(0) and the vehicle exterior humidity Hout(0) at the present time that are detected. The vehicle exterior temperature Tin(0) and the vehicle exterior humidity Hin(0) are detected through the vehicle exterior temperature sensor and the vehicle exterior humidity sensor according to the above description. Alternatively, any given value may be set through, for example, an input unit including a monitor, a keyboard, and a mouse.

Under the condition of t>0, the vehicle exterior environment predicting unit 43 predicts, in particular, the vehicle exterior temperature Tout(t) and the vehicle exterior humidity Hout(t) at the time t from, for example, a weather forecast. The vehicle exterior environment predicting unit 43 provides the thermal load predicting unit 45 with, as the vehicle exterior environment, the vehicle exterior temperature Tout(t) and the vehicle exterior humidity Hout(t) that are predicted.

The vehicle condition predicting unit 44 is configured to have the functions of the vehicle condition detector 24 and the vehicle condition predicting unit 25 according to the embodiment 1 described above. The vehicle condition predicting unit 44 includes, for example, a position sensor, a load compensation sensor, and an electric power sensor. Under the condition of t=0, the vehicle condition predicting unit 44 detects the vehicle conditions. Under the condition of t>0, the vehicle condition predicting unit 44 predicts the vehicle conditions.

In particular, under the condition of t=0, the vehicle condition predicting unit 44 detects, through the position sensor, a position (x(t), y(t), and z(t)) of the vehicle 100 at the time t=0, which is referred to as a position (x(0), y(0), and z(0)) of the vehicle 100. The vehicle condition predicting unit 44 detects, through the load compensation sensor, a passenger load factor θ(t) at the time t=0, which is referred to as a passenger load factor θ(0). In addition, the vehicle condition predicting unit 44 detects, through the electric power sensor, power-running/regenerative electric power P(t) at the time t=0, which is referred to as power-running/regenerative electric power P(0).

The passenger load factor θ(0) is computed as described below. The vehicle condition predicting unit 44 detects the weight of the vehicle 100 through the load compensation sensor and computes the number of passengers from the weight of the vehicle 100 detected through the load compensation sensor assuming that the body weight per passenger is, for example, 65 kg. The vehicle condition detector 44 computes, as the passenger load factor θ(0), the ratio of the computed number of passengers to the predetermined passenger capacity of the vehicle 100.

The vehicle condition predicting unit 44 provides the thermal load predicting unit 45 with the passenger load factor θ(0) that is detected. The vehicle condition predicting unit 44 provides the air conditioning output planning unit 48 with the passenger load factor θ(0), the position (x(0), y(0), and z(0)) of the vehicle 100, and the power-running/regenerative electric power P(0) that are detected. The position (x(0), y(0), and z(0)) of the vehicle 100, the passenger load factor θ(0), and the power-running/regenerative electric power P(0) [kW] are detected through the position sensor, the load compensation sensor, and the electric power sensor according to the above description. Alternatively, any given value may be set through, for example, an input unit including a monitor, a keyboard, and a mouse.

Under the condition of t>0, the vehicle condition predicting unit 44 predicts, in particular, the position (x(t), y(t), and z(t)) of the vehicle 100, an acceleration a(t), a velocity v(t), a slope s(t), and the passenger load factor θ(t) at the time t on the basis of the travel plan obtained from the travel plan database 52 of the train to which the vehicle 100 belongs and of the past passenger load factor stored in the past passenger-load-factor database 51.

The vehicle condition predicting unit 44 provides the thermal load predicting unit 45 with the passenger load factor θ(t) at the time t that is predicted. The vehicle condition predicting unit 44 provides the power-running/regenerative electric power predicting unit 46 with an acceleration a(ta), a velocity v(ta), a slope s(ta), and a passenger load factor θ(ta) of the vehicle 100 at a time ta (ta>t) after the time t that are predicted. The vehicle condition predicting unit 44 provides the air conditioning output planning unit 48 with the passenger load factor θ(ta) at a time ta (ta>t) after the time t and the position (x(t), y(t), and z(t)) of the vehicle 100 at the time t that are predicted.

The thermal load predicting unit 45 corresponds to the thermal load calculating unit 26 according to the embodiment 1 described above that is configured to have the function of the thermal load predicting unit for predicting the thermal load. Under the condition of t=0, the thermal load predicting unit 45 calculates a thermal load Q(t) at the time t=0, which is referred to as a thermal load Q(0). Under the condition of t>0, the thermal load predicting unit 45 predicts the thermal load at or after the prediction time point, for example, the thermal load Q(t) at the time t.

In particular, under the condition of t=0, similarly to the thermal load calculating unit 26 according to the embodiment 1, for example, the thermal load predicting unit 45 calculates the vehicle interior thermal load Q(t) at the time t=0, which is referred to as the vehicle interior thermal load Q(0), from the vehicle interior temperature Tin(0), the vehicle interior humidity Hin(0), the vehicle exterior temperature Tout(0), the vehicle exterior humidity Hout(0), the passenger load factor θ(0), a vehicle-interior-temperature set value Tset(0), a vehicle-interior-humidity set value Hset(0), and a target settling time tc(0) [s].

The thermal load predicting unit 45 provides the air conditioning output planning unit 48 with the vehicle interior thermal load Q(0) that is calculated. The thermal load predicting unit 45 determines an operation mode OM(0) of the air conditioner model 49 at the time t=0 on the basis of the vehicle interior thermal load Q(0) that is calculated, and provides the air conditioning output planning unit 48 with the operation mode OM(0) that is determined.

Under the condition of t>0, the thermal load predicting unit 45 predicts the vehicle interior thermal load Q(t) the time t, for example, from the vehicle interior temperature Tin(t) and the vehicle interior humidity Hin(t) at the time t that are provided by the vehicle interior environment predicting unit 42, from the vehicle exterior temperature Tout(t) and the vehicle exterior humidity Hout(t) at the time t that are provided by the vehicle exterior environment predicting unit 43, from the passenger load factor θ(t) at the time t that is provided by the vehicle condition predicting unit 44, and from the vehicle-interior-temperature set value Tset(t), the vehicle-interior-humidity set value Hset(t), and the target settling time tc(t) at the time t that are provided by the target environment condition setter 41.

The thermal load predicting unit 45 provides the vehicle interior environment predicting unit 42 and the air conditioning output planning unit 48 with the vehicle interior thermal load Q(t) at the time t that is predicted. The thermal load predicting unit 45 determines the operation mode of the air conditioner 6 at or after the prediction time point, for example, an operation mode OM(t) of the air conditioner model 49 at the time t on the basis of the vehicle interior thermal load Q(t) at the prediction time t that is the time at which the prediction is performed, and then provides the air conditioning output planning unit 48 with the operation mode OM(t) that is determined.

The power-running/regenerative electric power predicting unit 46 is configured to have the function equal to that of the power-running/regenerative electric power predicting unit 27 according to the embodiment 1 described above.

The power-running/regenerative electric power predicting unit 46 predicts power-running/regenerative electric power at or after the time t, for example, power-running/regenerative electric power P(ta) at a time ta (ta>t) after the time t from the travel plan of the vehicle 100 and the acceleration, the velocity, the slope and the passenger load factor or the vehicle 100 at or after the time t that is the prediction time point, for example, the acceleration a(ta), the velocity v(ta), the slope s(ta), and the passenger load factor θ(ta) of the vehicle 100 at the time ta (ta>t) after the time t that are provided by the vehicle condition predicting unit 44. The power-running/regenerative electric power predicting unit 46 provides the air conditioning output planning unit 48 with the power-running/regenerative electric power at or after time t, for example, the power-running/regenerative electric power P(ta) at the time ta (ta>t) after the time t that is predicted.

The air conditioning output planning unit 48 corresponds to the air conditioning output calculating unit 29 according to the embodiment 1 described above that is configured to have the function of the air conditioning output planning unit for planning the air conditioning output.

The air conditioning output planning unit 48 plans an output command value Qs(t) for the air conditioner model 49 at the time t, for example, on the basis of the passenger load factor at or after the time t, for example, the passenger load factor θ(ta) at the time ta (ta>t) after the time t, the position (x(t), y(t), and z(t)) of the vehicle 100, and the power-running/regenerative electric power P(t) at the time t that are provided by the vehicle condition predicting unit 44, of the vehicle interior thermal load Q(t) and the operation mode OM(t) of the air conditioner model 49 at the time t that are provided by the thermal load predicting unit 45, of the power-running/regenerative electric power at or after the time t, for example, the power-running/regenerative electric power P(ta) at the time ta (ta>a) after the time t that is provided by the power-running/regenerative electric power predicting unit 46, and of the vehicle-interior-temperature lower-limit value Tmin(t) and the vehicle-interior-temperature upper-limit value Tmax(t) at the time t that are provided by the target environment condition setter 41. The air conditioning output planning unit 48 provides the air conditioning controller 50 with the output command value Qs(t) for the air conditioner model 49 that is planned.

The air conditioning control unit 50 controls the air conditioner model 49 on the basis of, for example, the output command value Qs(t) for the air conditioner model 49 at the time t that is provided by the air conditioning output planning unit 48.

The air conditioner model 49 models the input and output characteristics of the air conditioner 6, in other words, the relations between the power consumption and the air conditioning load. The air conditioner model 49 is controlled on the basis of the output command value Qs(t) for the air conditioner model 49 at the time t that is planned by the air conditioning output planning unit 48. Consequently, the air conditioner model 49 outputs power consumption Pout(t) and an air conditioning load Qout at the time t caused by the air conditioning. The air conditioner model 49 provides the vehicle interior environment predicting unit 42 with the air conditioning load Qout(t) at the time t.

In addition, the air conditioner model 49 may calculate a blow-off temperature Tac(t), a blow-off humidity Hac(t), and a blow-off flow rate Aac(t) of the air blown by the air conditioner model 49 on the basis of the air conditioning load Qout(t), the vehicle interior temperature Tin(t), the vehicle interior humidity Hin(t), the vehicle exterior temperature Tout(t), the vehicle exterior humidity Hout(t), and the operation mode OM(t) through the use of, for example, a simulator imitating the air conditioner 6, to thereby provide the calculations to the vehicle interior environment predicting unit 42.

Figure 10:
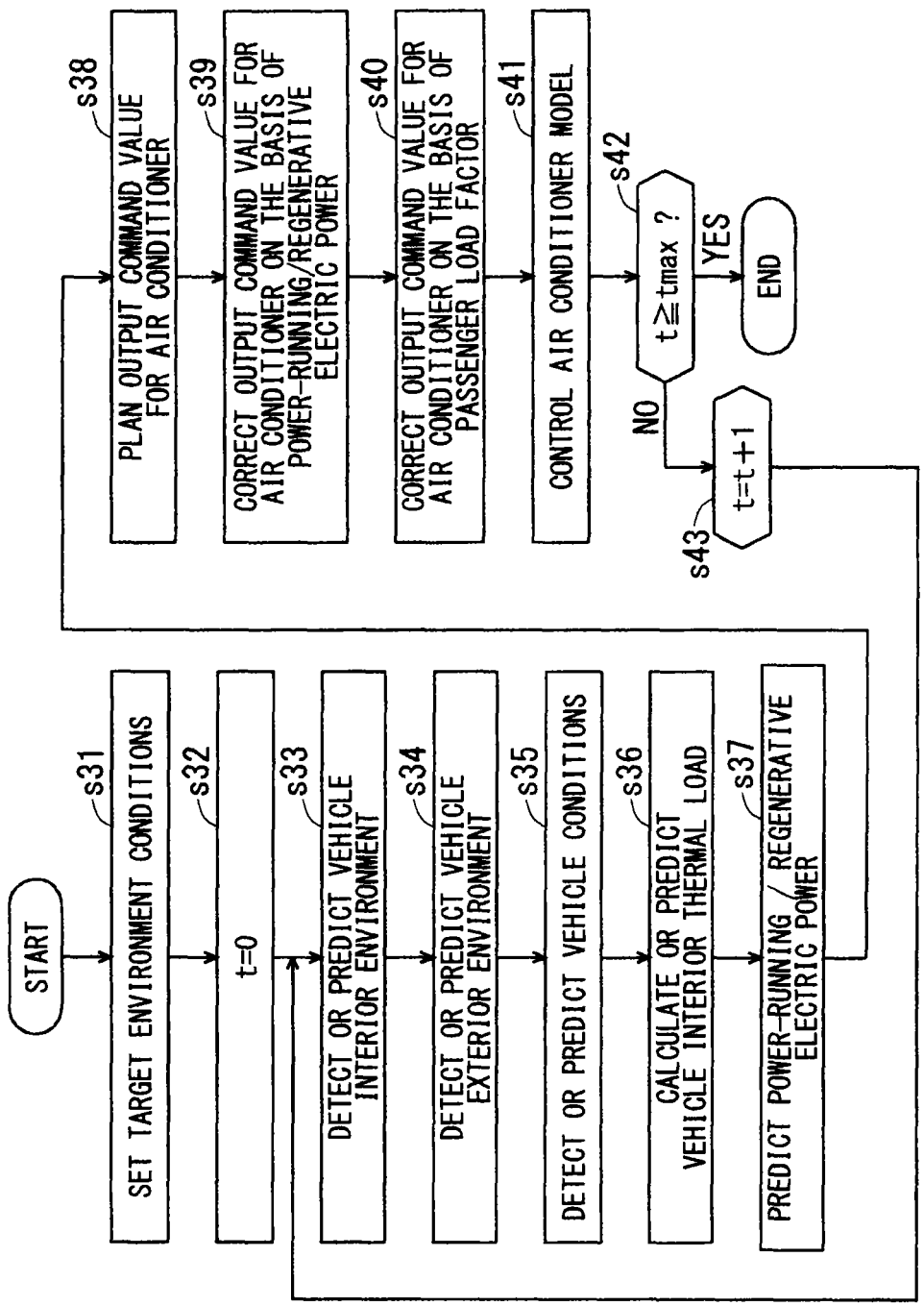
FIG. 10 A flowchart showing procedures of the air conditioning processing by the air conditioning control device 1B according to the embodiment 3 of the present invention.

FIG. 10 is a flowchart showing procedures of the air conditioning processing by the air conditioning control device 1B according to the embodiment 3 of the present invention. According to the present embodiment, the following describes the operation of the air conditioning control device 1B in cooling or dehumidifying the vehicle 100 as an example of the operation of the air conditioning control device 1B in the air conditioning processing. Each part of the processing in the flowchart shown in FIG. 10 is executed by one of the component units of the air conditioning control device 1B. The processing in the flowchart shown in FIG. 10 starts when the air conditioning control device 1B is supplied with electric power, and then moves on to Step s31.

In Step s31, the target environment condition setter 41 sets the target environment conditions. In particular, the target environment condition setter 41 inputs the vehicle-interior-temperature set value Tset(t) [° C.], the vehicle-interior-humidity set value Hset(t) [%], the vehicle-interior-temperature lower-limit value Tmin(t) [° C.], the vehicle-interior-temperature upper-limit value Tmax(t) [° C.], and the target settling time tc(t) [sec] at the time t through the input unit including a monitor, a keyboard, and a mouse. In Step s32, the time t is set at 0 (t=0).

In Step s33, the vehicle interior environment predicting unit 42 detects the vehicle interior environment under the condition of t=0. In particular, the vehicle interior environment predicting unit 42 detects the vehicle interior temperature Tin(t) [° C.] at the time t=0, which is referred to as the vehicle interior temperature Tin(0) [° C.] through the vehicle interior temperature sensor. In addition, the vehicle interior environment predicting unit 42 detects the vehicle interior humidity Hin(t) [%] at the time t=0, which is referred to as the vehicle interior humidity Hin(0) [%] through the vehicle interior humidity sensor.

The vehicle interior environment predicting unit 42 predicts the vehicle interior environment under the condition of t>0. In particular, the vehicle interior environment predicting unit 42 predicts the vehicle interior temperature Tin(t) [° C.] and the vehicle interior humidity Hin(t) [%] at the time t on the basis of the vehicle interior temperature Tin(t−1) immediately before the time t, of the vehicle interior humidity Hin(t−1) immediately before the time t, of the thermal load Q(t−1) [W] and the operation mode OM(t−1) that are predicted in Step s36 described below, and of the air conditioning load Qout(t−1) [W] that is output from the air conditioner model 49 in Step s41 described below.

Assuming that the blow-off temperature Tac(t−1) [° C.], the blow-off humidity Hac(t−1) [%], and the blow-off flow rate Aac(t−1) [m$^3$] are provided by the air conditioner model 49, the temperature and the humidity of mixed air can be computed from these values, the vehicle interior temperature Tin(t−1) [° C.], the vehicle interior humidity Hin(t−1) [%], and the vehicle interior volumetric capacity Vin [m$^3$] through the use of a psychrometric chart, providing predictions on the vehicle interior temperature Tin(t) [° C.] and the vehicle interior humidity Hin(t) [%] at the time t.

In Step s34, the vehicle exterior environment predicting unit 43 detects the vehicle exterior environment under the condition of t=0. In particular, the vehicle exterior environment predicting unit 43 detects, through the vehicle exterior temperature sensor and the vehicle exterior humidity sensor, the vehicle exterior temperature Tout(t) [° C.] and the vehicle exterior humidity Hout(t) [%] at the time t=0, which are referred to as the vehicle exterior temperature Tout(0) [° C.] and the vehicle exterior humidity Hout(t) [%]. The vehicle exterior environment predicting unit 43 predicts the vehicle exterior environment under the condition of t>0. In particular, the vehicle exterior environment predicting unit 43 predicts the vehicle exterior temperature Tout(t) [° C.] and the vehicle exterior humidity Hout(t) [%] at the time t from, for example, a weather forecast.

In Step s35, under the condition of t=0, the vehicle condition predicting unit 44 detects the vehicle conditions. In particular, the vehicle condition predicting unit 44 detects, through the position sensor, the position (x(t), y(t), and z(t)) of the vehicle 100 at the time t=0, which is referred to as the position (x(0), y(0), and z(0)) of the vehicle 100. The vehicle condition predicting unit 44 detects, through the load compensation sensor, the passenger load factor θ(t) at the time t=0, which is referred to as the passenger load factor θ(0). In addition, the vehicle condition predicting unit 44 detects, through the electric power sensor, the power-running/regenerative electric power P(t) at the time t=0, which is referred to as the power-running/regenerative electric power P(0).

Under the condition of t>0, the vehicle condition predicting unit 44 predicts the vehicle conditions. In particular, the vehicle condition predicting unit 44 predicts the position (x(t), y(t), and z(t)) of the vehicle 100 at the time t, the passenger load factor θ(t) at the time t, the acceleration a(t) [km/h/s], the velocity v(t) [km/h], and the slope s(t) [%] of the vehicle 100 at the time t on the basis of the travel plan obtained from the travel plan database 52 of the train to which the vehicle 100 belongs and of the past passenger load factor stored in the past passenger-load-factor database 51.

In Step s36, under the condition of t=0, the thermal load predicting unit 45 calculates the vehicle interior thermal load at the time t=0. In particular, similarly to the thermal load calculating unit 26 according to the embodiment 1, the thermal load predicting unit 45 calculates the vehicle interior thermal load Q(0) [W] from the vehicle interior temperature Tin(0) [° C.], the vehicle interior humidity Hin(0) [%], the vehicle exterior temperature Tout(0) [° C.], the vehicle exterior humidity Hout(0) [%], the passenger load factor θ(0), the vehicle-interior-temperature set value Tset(0) [° C.], the vehicle-interior-humidity set value Hset(0) [%], and the target settling time tc(0) [s].

Under the condition of t>0, the thermal load predicting unit 45 predicts the vehicle interior thermal load at the time t. In particular, the thermal load predicting unit 45 predicts the vehicle interior thermal load Q(t) [W] at the time t from the vehicle interior temperature Tin(t) [° C.], the vehicle interior humidity Hin(t) [%], the vehicle exterior temperature Tout(t) [° C.], the vehicle exterior humidity Hout(t) [%], the passenger load factor θ(t), the vehicle-interior-temperature set value Tset(t) [° C.], the vehicle-interior-humidity set value Hset(t) [%], and the target settling time tc(t) [s] at the time t.

The vehicle interior thermal load Qt [W] at the time t is obtained from Expression (11) described below. According to Expression (11), a vehicle interior heat quantity Qin(t) [Ws], which needs to be removed to attain the vehicle-interior-temperature set value and the vehicle-interior-humidity set value, is removed from the vehicle interior temperature and the vehicle interior humidity at the time t over the target settling time tc(t) [s]. The amount of heat transferred from outside is represented by Qtrans(t) [W], the amount of heat inflow caused by opening of the doors is represented by Qex(t) [W], and the amount of heat emanating from passengers is represented by Qpas(t).

$$Q(t)=Q\text{in}(t)/tc(t)+Q\text{trans}(t)+Q\text{ex}(t)+Q\text{pas}(t) \quad (11)$$

The vehicle interior heat quantity Qin(t) [Ws] included in Expression (11) is obtained from Expression (12) described below that includes a vehicle interior specific enthalpy Ein(t) [J/kg], a target specific enthalpy Eset(t) [J/kg], the vehicle interior volumetric capacity Vin [m$^3$], and an air density p(t) [kg/m$^3$]. The vehicle interior specific enthalpy Ein(t) [J/kg] is computed from the vehicle interior temperature Tin(t) [° C.] and the vehicle interior humidity Hin(t) [%]. The target specific enthalpy Eset(t) [J/kg] is computed from the vehicle-interior-temperature set value Tset(t) and the vehicle-interior-humidity set value Hset(t).

$$Q\text{in}(t) = V\text{in} \times \rho(t) \times (E\text{in}(t) - E\text{set}(t)) \quad (12)$$

The amount of heat Qtrans(t) [W] transferred from outside that is included in Expression (11) is obtained from Expression (13) described below in which the α [W/m²·K] represents the heat transfer coefficient of the vehicle body and the A [m²] represents the heat transmission area of the vehicle body.

$$Q\text{trans}(t) = A \times \alpha \times (T\text{out}(t) - T\text{in}(t)) \quad (13)$$

The amount of heat inflow Qex(t) [W] caused by opening of the doors that is included in Expression (11) is obtained from Expression (14) described below in which Vex(t) [m³/s] represents the air volume exchanged between the inside and outside per unit time.

$$Q\text{ex}(t) = V\text{ex}(t) \times \rho(t) \times (E\text{out}(t) - E\text{in}(t)) \quad (14)$$

The amount of heat Qpas(t) [W] emanating from passengers that is included in Expression (11) is obtained from Expression (15) described below in which the Qman [W/person] represents the amount of emanated heat per person per unit time and the Mmax [person] represents the passenger capacity of the vehicle 100.

$$Q\text{pas}(t) = \theta(t) \times M\text{max} \times Q\text{man} \quad (15)$$

In Step s36, the thermal load predicting unit 45 calculates or predicts the vehicle interior thermal load Q(t) as described above and determines whether the vehicle interior dehumidification is necessary to keep the vehicle interior comfort on the basis of the vehicle interior temperature Tin(t) [° C.], the vehicle interior humidity Hin(t) [%], the vehicle-interior-temperature set value Tset(t) [° C.], and the vehicle-interior-humidity set value Hset(t) [%].

When no need for dehumidification is determined, the thermal load predicting unit 45 provides the air conditioning output planning unit 48 with the command to operate the air conditioner model 49 in the cooling mode along with the thermal load Q(t) [W] that is calculated or predicted. When the need for dehumidification is determined, the thermal load predicting unit 45 provides the air conditioning output planning unit 48 with the command to operate the air conditioner model 49 in the dehumidification mode along with the thermal load Q(t) [W] that is calculated or predicted.

In Step s37, the power-running/regenerative electric power predicting unit 46 predicts the power-running/regenerative electric power under the condition of t>0. In particular, the power-running/regenerative electric power predicting unit 46 predicts the power-running/regenerative electric power P(t) [kW] at the time t from the acceleration a(t) [km/h/s], the velocity v(t) [km/h], the slope s(t) [%], and the passenger load factor θ(t) of the vehicle 100 at the time t.

The power-running/regenerative electric power predicting unit 46 more particularly predicts the power-running/regenerative electric power P(t) [kW] at the time t through the use of, for example, Expression (16) described below. In Expression (16), g is the function for predicting the power-running/regenerative electric power.

$$P(t) = g(a(t), v(t), s(t), \theta(t)) \quad (16)$$

According to Expression (16), the power-running/regenerative electric power P(t) [kW] at the time t is predicted from the four values including the acceleration a(t), the velocity v(t), the slope s(t) [%], and the passenger load factor θ(t) of the vehicle 100 at the time t. Alternatively, the power-running/regenerative electric power P(t) [kW] at the time t may be predicted through the use of the expression formulated in detail with consideration given to, for example, the air resistance.

In Steps s38 to s40, the air conditioning output planning unit 48 determines the output command value Qs(t) [W] for the air conditioner model 49 at the time t on the basis of the position (x(t), y(t), and z(t)) of the vehicle 100, the vehicle interior thermal load Q(t) [W], the power-running/regenerative electric power P(t) [kW], the vehicle-interior-temperature lower-limit value Tmin(t) [° C.], the vehicle-interior-temperature upper-limit value Tmax(t) [° C.] at the time t and on the basis of the passenger load factor and the power-running/regenerative electric power at or after the time t, for example, the passenger load factor θ(ta) and the power-running/regenerative electric power P(ta) [kW] (provided ta>t) at the time ta after the time t.

Firstly, in Step s38, the air conditioning output planning unit 48 plans the output command value Qs(t) [W] for the air conditioner model 49 at the time t in accordance with Qs(t)=h (Q(t)) and sets the operation mode of the air conditioner model 49 that agrees with the operation mode determined in Step s36, particularly, with the cooling mode or the dehumidification mode. In the above expression, h is the function for calculating the output command value Qs(t) for the air conditioner model 49 at the time t. For example, the function h is defined such that Qs(t) [W] is equal to Q(t).

Next, in Steps s39 and s40 described below, the air conditioning output planning unit 48 corrects the output command value Qs(t) [W] for the air conditioner model 49 at the time t that is planned in Step s38. In Step s39, the air conditioning output planning unit 48 corrects the output command value Qs(t) [W] for the air conditioner model 49 at the time t on the basis of the power-running/regenerative electric power P(t) [kW] at the time t. In the present embodiment, during power running, the air conditioning output planning unit 48 performs the processing for correcting the output command value Qs(t) [W] at the time t such that the output of the air conditioner model 49 decreases. During regeneration, the air conditioning output planning unit 48 performs the processing for correcting the output command value Qs(t) [W] at the time t such that the output of the air conditioner model 49 increases.

Assuming that the vehicle interior temperature Tin(t) [° C.] falls within the predetermined acceptable range, particularly, within the range of the vehicle-interior-temperature lower-limit value Tmin(t) [° C.] inclusive to the vehicle-interior-temperature upper-limit value Tmax(t) [° C.] inclusive, in a case where the power-running/regenerative electric power P(t) [kW] indicates a positive value for power running, the air conditioning output planning unit 48 corrects the output command value Qs(t) [W] for the air conditioner model 49 at the time t in accordance with Qs(t)×h1 (P(t)). As shown by the broken line in FIG. 4 described above, h1 is the function indicating a monotone decrease to the lower limit of 0.

Meanwhile, in a case where the power-running/regenerative electric power P(t) [kW] at the time t indicates a negative value for regeneration, the air conditioning output planning unit 48 corrects the output command value Qs(t) [W] for the air conditioner model 49 at the time t in accordance with Qs(t)×h2 (P(t)). As shown by the solid line in FIG. 4 described above, h2 is the function indicating a monotone decrease.

When the output command value Qs(t) [W] for the air conditioner model 49 at the time t exceeds the maximum output Qsmax [W] of the air conditioner model 49, the output command value Qs(t) [W] for the air conditioner 6 at the time t is maximized, or in other words, is set at the maximum output Qsmax of the air conditioner 6.

The air conditioning output planning unit 48 corrects the output command value Qs(t) [W] for the air conditioner model 49 on the basis of the power-running/regenerative electric power P(ta) [kW] (provided ta>t) at the time ta at or after the time t. According to the present embodiment, if the power running after the time t is predicted, the air conditioning output planning unit 48 performs the processing for correcting the output command value Qs(t) [W] such that the output of the air conditioner model 49 increases. If the regeneration at or after the time t is predicted, the air conditioning output planning unit 48 performs the processing for correcting the output command value Qs(t) [W] such that the output of the air conditioner model 49 decreases.

The air conditioning output planning unit 48 barely corrects the output command value Qs(t) [W] for the air conditioner model 49 on the basis of the above-described power-running/regenerative electric power P(t) [kW] during, for example, the coasting and the stopping of the train without generation of power-running/regenerative electric power. Meanwhile, if the power running or regeneration at or after the time t is predicted, the air conditioning output planning unit 48 performs the following processing.

In a case where the power-running/regenerative electric power P(ta) [kW] at the time ta after the time t indicates a positive value for power running for some time, for example, 30 seconds or more within a period of time starting immediately after the time t and extending up to 60 seconds, the air conditioning output planning unit 48 corrects the output command value Qs(t) [W] for the air conditioner model 49 in accordance with h3 (ΣP(ta))×Qs(t). As shown by the broken line in FIG. 5 described above, h3 is the function indicating the monotonous increase from the lower limit of 1.

In a case where the power-running/regenerative electric power P(ta) [kW] at the time ta after the time t indicates a negative value for regeneration for some time, for example, 30 seconds or more within a period of time starting immediately after the time t and extending up to 60 seconds, the air conditioning output command planning unit 48 corrects the output command value Qs(t) [W] for the air conditioner model 49 in accordance with h4 (ΣP(ta))×Qs(t). As shown by the solid line in FIG. 5 described above, h4 is the function indicating the monotonous increase to the upper limit of 1.

When the output command value Qs(t) [W] for the air conditioner model 49 exceeds the maximum output Qsmax [W] of the air conditioner 6, the output command value Qs(t) [W] for the air conditioner model 49 is maximized, or in other words, is set at the maximum output Qsmax [W] of the air conditioner 6.

Although Step s39 refers to the correction of the output command value Qs(t) [W] for the air conditioner model 49 at the time t by the multiplication, the correction method is not limited thereto. For example, during power running, the output command value Qs(t) [W] for the air conditioner model 49 at the time t may be subjected to the subtraction processing as the power-running electric power increases from the lower limit of 0. During regeneration, the command output value Qs(t) [W] for the air conditioner model 49 at the time t may be subjected to the addition processing as the regenerative electric power increases. The output command value Qs(t) [W] for the air conditioner model 49 is not corrected in Step s39 unless the vehicle interior temperature Tin(t) [° C.] falls within the range of the vehicle-interior-temperature lower-limit value Tmin(t) [° C.] inclusive to the vehicle-interior-temperature upper-limit value Tmax(t) [° C.] inclusive.

For the power running to be continued for some time to come at or after the time t as in the case of a series of upward slopes, the processing in Step s39 provides the advance cooling during the coasting and the stopping, thereby allowing power saving for the electric power peak during power running. For the regeneration to be continued for some time to come at or after the time t as in the case of a series of downward slopes, the processing in Step s39 avoids excessive cooling during the coasting and the stopping, thereby recovering greater regenerative electric power during regeneration and thus saving energy.

In Step s40, the air conditioning output planning unit 48 corrects the output command value Qs(t) [W] for the air conditioner model 49 at the time t on the basis of the passenger load factor θ(ta) at the time ta after the time t. For example, assuming that the vehicle interior temperature Tin(t) [° C.] falls within the predetermined acceptable range, particularly, within the range of the vehicle-interior-temperature lower-limit value Tmin(t) [° C.] inclusive to the vehicle-interior-temperature upper-limit value Tmax(t) [° C.] inclusive, the air conditioning output planning unit 48 computes the boarding-and-alighting completion time tr [s] from the arrival in the next station to the completion of boarding and alighting of passengers on the basis of the position (x(t), y(t), and z(t)) of the vehicle 100 at the time t. The air conditioning output planning unit 48 performs the following processing when the boarding-and-alighting completion time tr [s] is less than the predetermined set value trmax [sec], which is, for example, 60 seconds.

Under the condition of ta=t+tr, in a case where the passenger load factor θ(ta) at the time ta that is smaller than the passenger load factor θ(t) at the time t, the output command value Qs(t) [W] for the air conditioner model 49 at the time t is obtained from Expression (17) described below, whereby the output of the air conditioner model 49 is reduced. In Expression (17), the θmax represents the maximum value of the passenger load factor of the vehicle 100.

$$Qs(t)=Qs(t)\times\{1-(\theta(t)-\theta(ta))/\theta max\} \quad (17)$$

In a case where the passenger load factor θ(ta) at the time ta is greater than the passenger load factor θ(t) at the time t, the output command value Qs(t) [W] for the air conditioner model 49 at the time t is obtained from Expression (18) described below, whereby the output of the air conditioner model 49 is increased.

$$Qs(t)=Qs(t)\times\{1+(\theta(ta)-\theta(t))/\theta max\} \quad (18)$$

In Step s40, the output command value Qs(t) [W] for the air conditioner model 49 at the time t is corrected on the basis of the passenger load factor θ(ta) at the time ta as described above, to thereby improve the vehicle interior comfort at the time of arrival in the next station.

In Step s41, the air conditioning controller 50 controls the air conditioner model 49. The air conditioning controller 50 controls the air conditioner model 49, for example, on the basis of the output command value Qs(t) [W] for the air conditioner model 49 at the time t and of the operation mode determined in Step s36. Consequently, the air conditioner model 49 outputs the power consumption Pout(t) [kW] and the air conditioning load Qout(t) [W] at the time t caused by air conditioning.

In Step s42, the air conditioning controller 50 determines whether the time t is past a finish time tmax [s] that is preset.

When the air conditioning controller 50 determines the time past the set finish time tmax [s] (t>tmax), the entire procedures end. When the air conditioning controller 50 determines the time t before the set finish time tmax [s] (t<tmax), the processing proceeds to Step s43.

In Step s43, the air conditioning output planning unit 48 sets the time t at t+1 (t=t+1). After the processing in Step s43 ends, the processing returns to Step s33.

Figure 11:
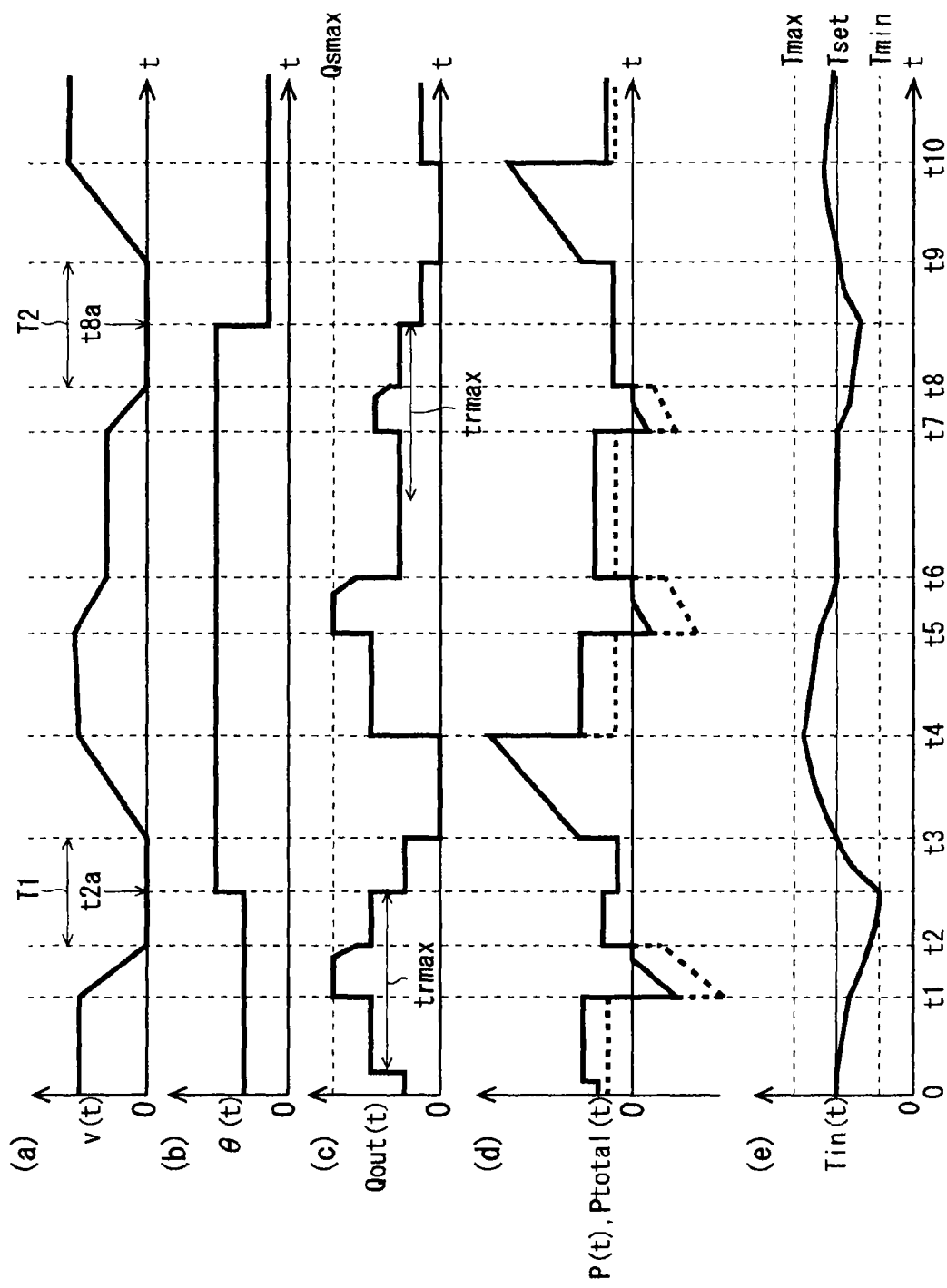
FIG. 11 A graph showing planning results of an air conditioning output planning unit 48 in the air conditioning control device 1B according the embodiment 3 of the present invention.

Each part of the processing in the flowchart shown in FIG. 10 is performed as described above, providing, for example, the graph shown in FIG. 11. FIG. 11 is a graph showing planning results of the air conditioning output planning unit 48 in the air conditioning control device 1B according to the embodiment 3 of the present invention. The axis of ordinates of the graph in part (a) of FIG. 11 represents the velocity v(t) [km/h] of the vehicle 100 at the time t. The axis of ordinates of the graph in part (b) of FIG. 11 represents the passenger load θ(t) at the time t. The axis of ordinates of the graph in part (c) of FIG. 11 represents the air conditioning load Qout(t) [W] at the time t. The axis of ordinates of the graph in part (d) of FIG. 11 represents the power-running/regenerative electric power P(t) [kW] at the time t and power consumption Ptotal(t) [kW] that is the sum of the power-running/regenerative electric power P(t) [kW] and the power consumption Pout(t) [kW] caused by air conditioning. The axis of ordinates of the graph in part (e) of FIG. 11 represents the vehicle interior temperature Tin(t) [° C.] at the time t. The axes of abscissas of the graphs in parts (a) to (e) of FIG. 11 represent the time t.

In a section in which the time t satisfies the condition of 0≤t<t1, the vehicle interior temperature Tin [° C.] is around the vehicle-interior-temperature set value Tset [° C.]. In preparation for an increase in the vehicle interior temperature Tin [° C.] resulting from the opening of the doors and the increase in the passenger load factor θ(t) for a stoppage time T1 (t2 to t3) at a station A, when the boarding-and-alighting completion time tr [s] required for the completion of boarding and alighting of passengers at the station A becomes smaller than the set value trmax [s], the air conditioning load Qout [W] is increased in consideration of comfort.

In a section in which the time t satisfies the condition of t1≤t<t2, the regenerative electric power is generated due to the deceleration of the vehicle 100. Thus, to recover a large amount of regenerative electric power, the air conditioning load Qout [W] is increased in consideration of energy saving.

In a section in which the time t satisfies the condition of t2≤t<t3, the vehicle 100 ends the deceleration on arrival at the station A, thereby stopping the generation of regenerative electric power. Thus, the air conditioning load Qout [W] is decreased temporarily. During the stoppage at the station A, the air conditioning load Qout [W] is adjusted such that the vehicle interior temperature Tin [° C.] does not fall below the vehicle-interior-temperature lower-limit value Tmin [° C.] between the opening of the doors at a time t2a and the completion of boarding and alighting of passengers. After the completion of boarding and alighting of passengers, the air conditioning load Qout [W] is adjusted such that the vehicle interior temperature Tin [° C.] approaches the vehicle-interior-temperature set value Tset [° C.] in consideration of comfort.

In a section in which the time t satisfies the condition of t3≤t<t4, the power-running electric power is generated largely due to the acceleration of the vehicle 100. Thus, the air conditioning load Qout [W] is decreased to suppress the power consumption Ptotal(t) [kW] in consideration of power saving.

In a section in which the time t satisfies the condition of t4≤t<t5, the air conditioning load Qout [W] is increased such that the vehicle interior temperature Tin [° C.] approaches the vehicle-interior-temperature set value Tset [° C.] in consideration of comfort.

In a section in which the time t satisfies the condition of t5≤t<t6, the regenerative electric power is generated due to the deceleration of the vehicle 100. Thus, to recover a large amount of regenerative electric power, the air conditioning load Qout [W] is increased in consideration of energy saving.

In a section in which the time t satisfies the condition of t6≤t<t7, the vehicle interior temperature Tin [° C.] is around the vehicle-interior-temperature set value Tset [° C.]. In preparation for an increase in the vehicle interior temperature Tin [° C.] resulting from the opening of the doors and for a decrease in the vehicle interior temperature Tin [° C.] resulting from an decrease in the passenger load factor θ for a stoppage time T2 (t8 to t9) at a station B, when the boarding-and-alighting completion time tr [s] required for the completion of boarding and alighting of passengers at the station B becomes smaller than the set value trmax [s], the air conditioning load Qout [W] is adjusted in consideration of comfort. The increase and the decrease in the vehicle interior temperature Tin [° C.] cancel each other, so that the air conditioning load Qout [W] is kept at the original state.

In a section in which the time t satisfies the condition of t7≤t<t8, the regenerative electric power is generated due to the deceleration of the vehicle 100. Thus, to recover a large amount of regenerative electric power, the air conditioning load Qout [W] is increased in consideration of energy saving.

In a section in which the time t satisfies the condition of t8≤t<t9, the vehicle 100 ends the deceleration on arrival in the station B, thereby stopping the generation of regenerative electric power. Thus, the air conditioning load Qout [W] is decreased temporarily. During the stoppage at the station B, the air conditioning load Qout [W] is adjusted such that the vehicle interior temperature Tin [° C.] does not fall below the vehicle-interior-temperature lower-limit value Tmin [° C.] between the opening of the doors at a time t8a and the completion of boarding and alighting of passengers. After the completion of boarding and alighting of passengers, the air conditioning load Qout [W] is adjusted such that the vehicle interior temperature Tin [° C.] approaches the vehicle-interior-temperature set value Tset [° C.] in consideration of comfort.

In a section in which the time t satisfies the condition of t9≤t<t10, the power-running electric power is generated largely due to the acceleration of the vehicle 100. Thus, the air conditioning load Qout [W] is decreased to 0 in order to suppress the power consumption Ptotal(t) [kW] in consideration of power saving.

In a section in which the time t satisfies the condition of t≥t10, the air conditioning load Qout [W] is increased such that the vehicle interior temperature Tin [° C.] approaches the vehicle-interior-temperature set value Tset [° C.] in consideration of comfort.

The air conditioning output correction with the power-running/regenerative electric power P(ta) [kW] at the time ta after the time t, which is omitted from the description of FIG. 11, is performed similarly to the air conditioning output correction with the power-running/regenerative electric power at the time t and to the air conditioning output correction with the passenger load factor at or after the prediction time point.

In addition, from the graph in FIG. 11 showing the results of planning, replanning may be performed by correcting the air conditioning output with consideration given to the vehicle interior comfort and power consumption. Although an example of successive planning has been shown in the present embodiment, plans for a plurality of times may be created at the same time.

Thus, according to the present embodiment, the air conditioning output planning unit 48 determines, in Steps 38 to s40 the output command value Qs(t) [W] for the air conditioner model 49 at the time t on the basis of, for example, the vehicle interior thermal load Q(t) [W], the power-running/regenerative electric power P(t) [kW], the position (x(t), y(t), and z(t)) of the vehicle 100, the set temperatures including the vehicle-interior-temperature lower-limit value Tmin(t) [° C.] and the vehicle-interior-temperature upper-limit value Tmax(t) [° C.] at the time t and of the passenger load factor θ(ta) and the power-running/regenerative electric power P(ta) [kW] at the time ta after the time t. Consequently, the operation plan of the air conditioner 6 can be created with consideration given not only to the vehicle interior comfort but also to the energy saving and the power saving. This provides the air conditioning control device 1B capable of adequate air conditioning control from the comprehensive viewpoint of the energy saving, the power saving, and the vehicle interior comfort.

According to the present embodiment, the vehicle exterior environment predicting unit 43 detects or predicts, as the vehicle exterior environment, both the vehicle exterior temperature Tout and the vehicle exterior humidity Hout, and calculates or predicts the vehicle interior thermal load Q on the basis the Tout and the Hout. Alternatively, only the vehicle exterior temperature Tout may be used as the vehicle exterior environment. The use of only the vehicle exterior temperature Tout produces the effect similar to that of the present embodiment in which both the vehicle exterior temperature Tout and the vehicle exterior humidity Hout are used.

Embodiment 4

Figure 12:
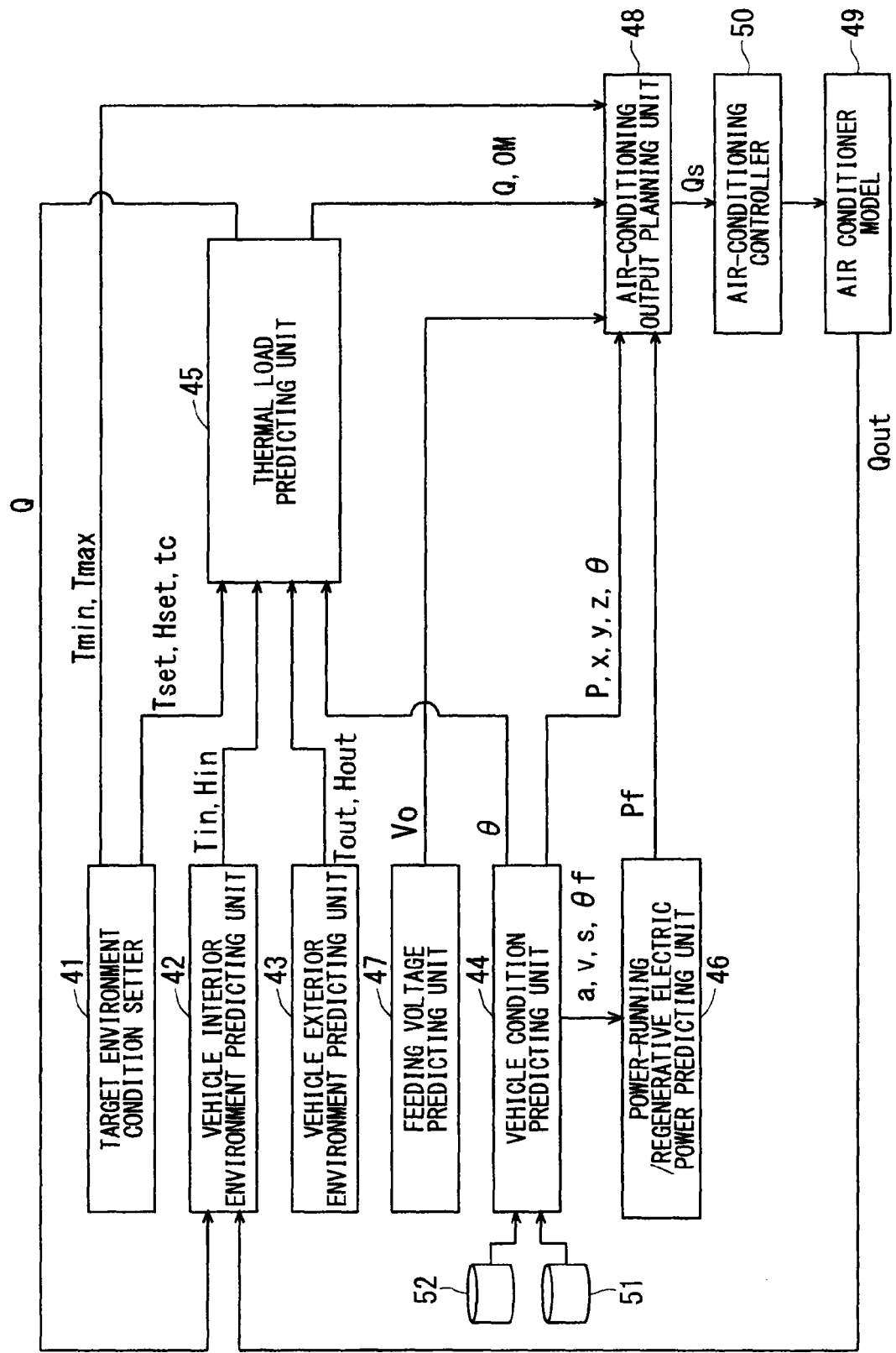
FIG. 12 A block diagram showing a configuration of an air conditioning control device 1C according to an embodiment 4 of the present invention.

FIG. 12 is a block diagram showing a configuration of an air conditioning control device 1C according to an embodiment 4 of the present invention. As the air conditioning control device 1C according to the present embodiment, the air conditioning control device 1B according to the embodiment 3 of the present invention shown in FIG. 9 described above is configured to further include a feeding voltage predicting unit 47. Similarly to the air conditioning control devices 1, 1A, and 1B according to the embodiments 1 to 3, the air conditioning control device 1C according to the present embodiment is the vehicle air conditioning control device. For example, the vehicle 100 shown in FIG. 1 described above includes the air conditioning control device 1C in place of the air conditioning control device 1 according to the embodiment 1. That is, the air conditioning control device 1C is included in the vehicle 100 to control the air conditioner 6 in the vehicle 100.

The following describes the differences between the configuration of the air conditioning control device 1C according to the embodiment 4 and the configuration of the air conditioning control device 1B according to the embodiment 3. The same reference signs indicate the configuration of the air conditioning control device 1C according to the embodiment 4 that is the same as the configuration of the air conditioning control device 1B according to the embodiment 3, and a description thereof is omitted.

The feeding voltage predicting unit 47 corresponds to the feeding voltage detector 28 according to the embodiment 2 described above that is configured to have the function of the feeding voltage predicting unit for predicting the feeding voltage. That is, the feeding voltage predicting unit 47 has the feeding voltage detecting function for detecting the feeding voltage and the feeding voltage predicting function for predicting the feeding voltage. The feeding voltage predicting unit 47 includes, for example, a feeding voltage sensor.

The feeding voltage predicting unit 47 detects, through the feeding voltage sensor, a feeding voltage Vo(t) at the time t=0, in other words, a feeding voltage Vo(0) at a travel point of the vehicle. The feeding voltage predicting unit 47 predicts, from the travel plan of the vehicle 100, the feeding voltage Vo(t) at a travel point of the vehicle 100 at the time t. The feeding voltage predicting unit 47 provides the air conditioning output planning unit 48 with the feeding voltage Vo(t) at the time t that is predicted.

The air conditioning output planning unit 48 plans the output command value Qs(t) for the air conditioner model 49 at the time t, for example, on the basis of the feeding voltage Vo(t) at the time t that is provided by the feeding voltage predicting unit 47, of the passenger load factor θ(ta) at a time ta (ta>t) after the time t, the position (x(t), y(t), and z(t)) of the vehicle 100, and the power-running/regenerative electric power P(t) at the time t that are provided by the vehicle condition predicting unit 44, of the vehicle interior thermal load Q(t) at the time t and the operation mode OM of the air conditioner model 49 that are provided by the thermal load predicting unit 45, of the power-running/regenerative electric power P(ta) at a time ta (ta>t) after the time t that is provided by the power-running/regenerative electric power predicting unit 46, and of the vehicle-interior-temperature lower-limit value Tmin(t) and the vehicle-interior-temperature upper-limit value Tmax(t) at the time t that are provided by the target environment condition setter 41. The air conditioning output planning unit 48 provides the air conditioning controller 50 with the output command value Qs(t) for the air conditioner model 49 that is planned.

Figure 13:
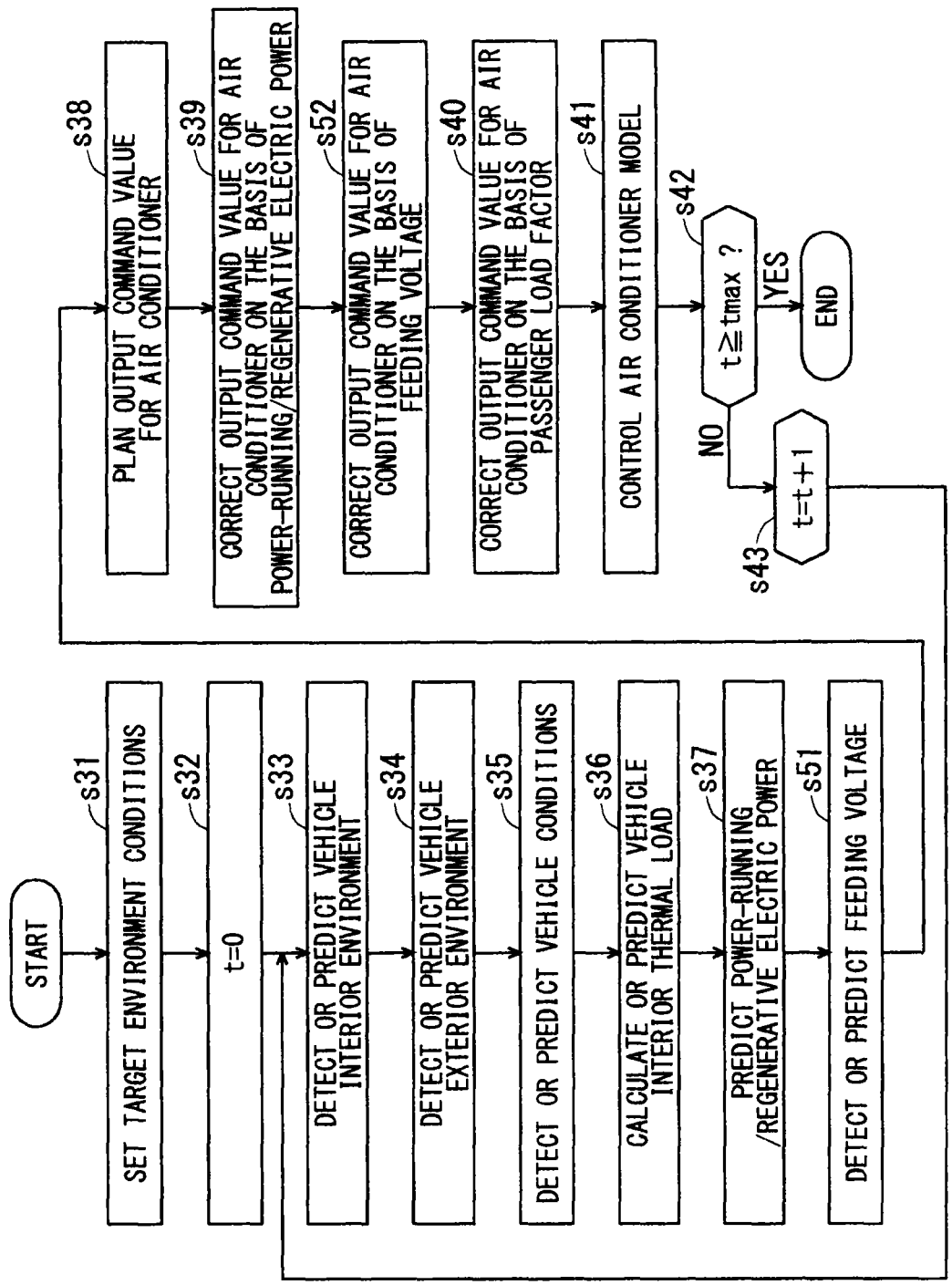
FIG. 13 A flowchart showing procedures of the air conditioning processing by the air conditioning control device 1C according to the embodiment 4 of the present invention.

FIG. 13 is a flowchart showing procedures of the air conditioning processing by the air conditioning control device 1C according to the embodiment 4 of the present invention. According to the present embodiment, the following describes the operation of the air conditioning control device 1C in cooling or dehumidifying the vehicle 100 as an example of the operation of the air conditioning control device 1C in the air conditioning processing. Each part of the processing in the flowchart shown in FIG. 13 is executed by one of the component units of the air conditioning control device 1C. The processing in the flowchart shown in FIG. 13 starts when the air conditioning control device 1C is supplied with electric power, and then moves on to Step s31.

The following describes the differences between the air conditioning processing by the air conditioning control device 1C according to the embodiment 4 and the air conditioning processing by the air conditioning control device 1B according to the embodiment 3.

In Step s51, under the condition of t=0, the feeding voltage predicting unit 47 detects the feeding voltage. In particular, the feeding voltage predicting unit 47 detects, through the feeding voltage sensor, the feeding voltage Vo(0) [V] at the present time at the travel point of the vehicle 100. Under the condition of t>0, the feeding voltage predicting unit 47 predicts the feeding voltage Vo(t) [V] at the travel point of the vehicle 100 at the time t from, for example, the travel plan of the vehicle 100.

In Step s52, the air conditioning output planning unit 48 corrects the output command value Qs(t) [W] for the air conditioner model 49 at the time t on the basis of the feeding voltage Vo(t) [V] at the time t.

Assuming that the vehicle interior temperature Tin [° C.] falls within the predetermined acceptable range, particularly, within the range of the vehicle-interior-temperature lower-limit value Tmin(t) [° C.] inclusive to the vehicle-interior-temperature upper-limit value Tmax(t) [° C.] inclusive, as shown in FIG. 8 described above, in a case where the feeding voltage Vo(t) [V] is smaller than the feeding-voltage lower-limit value Vomin [V], the air conditioning output planning unit 48 sets the output command value Qs(t) [W] for the air conditioner model 49 at the time t to 0 such that the output of the air conditioner model 49 turns off.

In a case where the feeding voltage Vo(t) [V] is between the feeding-voltage lower-limit value Vomin [V] and the feeding-voltage lower reference value Voset1 [V], the air conditioning output planning unit 48 obtains the output command value Qs(t) [W] for the air conditioner model 49 at the time t from Expression (19) described below, whereby the output of the air conditioner model 49 is reduced.

$$Qs(t)=Qs(t)\times(Vo(t)-Vomin)/(Voset1-Vomin) \quad (19)$$

In a case where the feeding voltage Vo(t) [V] is between the feeding-voltage upper reference value Voset2 [V] and the feeding-voltage upper-limit value Vomax [V], the air conditioning output planning unit 48 obtains the output command value Qs(t) [W] for the air conditioner model 49 at the time t from Expression (20) described below, whereby the output of the air conditioner model 49 is increased.

$$Qs(t)=Qs(t)+\{(Qsmax-Qs(t))\times(Vo(t)-Voset2)/(Vomax-Voset2)\} \quad (20)$$

In a case where the feeding voltage Vo(t) [V] is greater than the feeding-voltage upper-limit value Vomax [V], the output command value Qs(t) [W] the air conditioner model 49 at the time t is maximized, or in other words, is set at the maximum output Qsmax [W] of the air conditioner 6, whereby the output of the air conditioner model 49 is maximized.

In a case where the feeding voltage Vo(t) [V] falls within the range of the feeding-voltage lower reference value Voset1 [V] inclusive to the feeding-voltage upper reference value Voset2 [V] inclusive, the air conditioning output planning unit 48 sets the output command value Qs(t) [W] for the air conditioner model 49 at the time t to the reference value Qs_set of the output command value Qs shown in FIG. 8 described above.

In Step s52, the output command value Qs(t) [W] for the air conditioner model 49 at the time is corrected on the basis of the feeding voltage Vo(t) [V] as described above, so that the feeding voltage is prevented from deviating from the reference values Voset1 and Voset 2.

Thus, according to the present embodiment, the output command value for the air conditioner model 49 is corrected on the basis of the feeding voltage as well as of the power-running/regenerative electric power, the power-running/regenerative electric power at or after the prediction time point, and the passenger load factor at or after the prediction time point. Consequently, the operation control for the air conditioner 6 can be performed with consideration given to the vehicle interior comfort, the energy saving, and the power saving while the feeding voltage is prevented from deviating from the reference values. This provides the air conditioning control device 1C capable of more adequate air conditioning control from the comprehensive viewpoint of the energy saving, the power saving, and the vehicle interior comfort.

Embodiment 5

The embodiments 1 to 4 described above have referred to the air conditioning control devices 1, 1A, 1B, and 1C with consideration given to the vehicle interior comfort, the energy saving, and the power saving of the vehicle (hereinafter also referred to as "own vehicle" 100 having the own device mounted thereon. An embodiment 5 of the present invention refers to the air conditioning control device capable of providing an improvement in the vehicle interior comfort, the energy saving, and the power saving as the entire train system including a plurality of trains in cooperation with other trains surrounding the train including the own vehicle 100.

Figure 14:
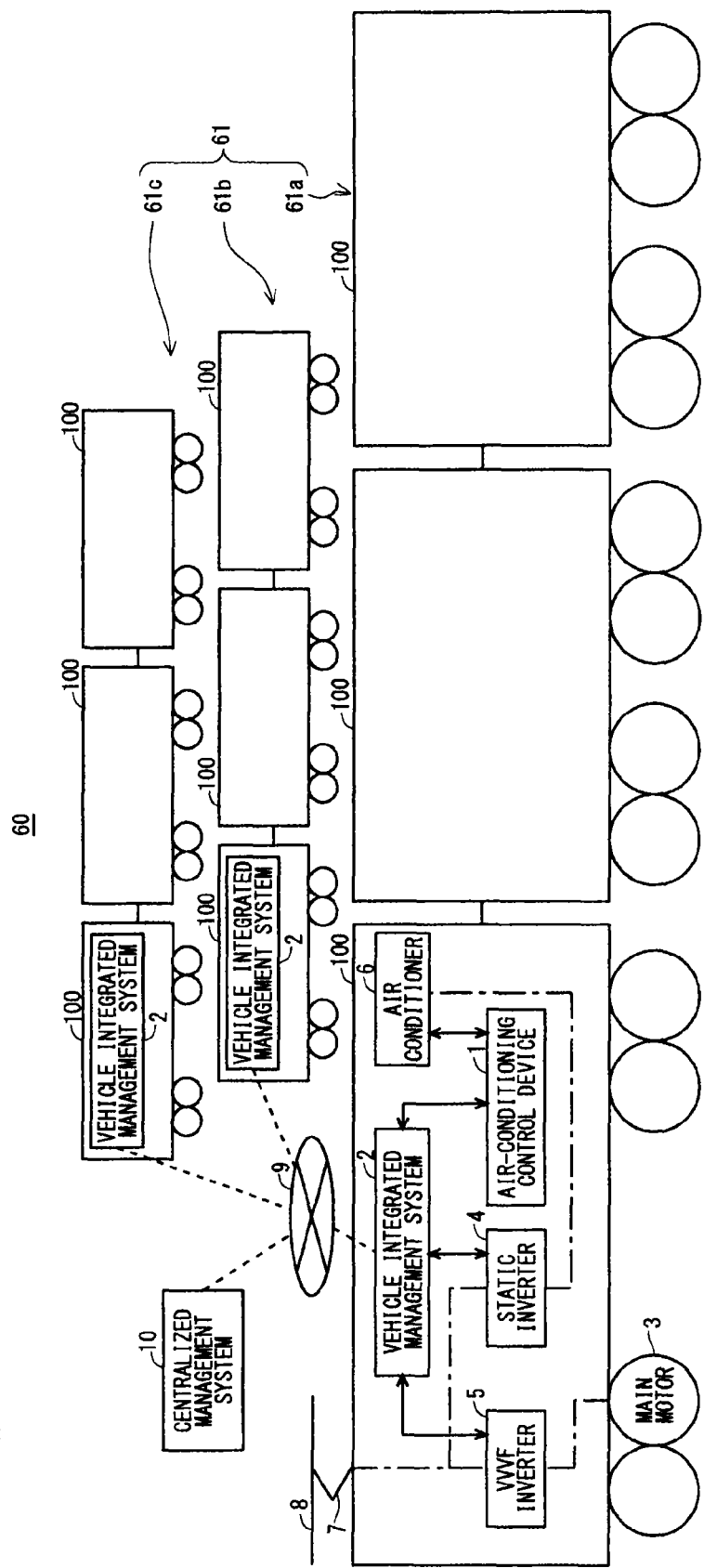
FIG. 14 A block diagram showing a configuration of a train system 60 having a plurality of trains 61 including a plurality of vehicles 100 equipped with the air conditioning control device 1 and a vehicle integrated management system 2 according to an embodiment 5 of the present invention.

FIG. 14 is a block diagram showing a configuration of a train system 60 with a plurality of trains 61 including a vehicle 100 equipped with the air conditioning control device 1 and the vehicle integrated management system 2 according to the embodiment 5 of the present invention. FIG. 14 shows the cooperation among a plurality of trains 61 included in the train system 60. FIG. 14 shows three trains as the plurality of trains 61. In the following description, the reference sign "61" refers to the three trains without distinction and the reference sign "61" having the letters "a," "b," and "c" affixed thereto refers to the three trains in distinction from one another.

Each train 61 includes a plurality of vehicles 100. The vehicle 100 included in each train 61 has the configuration similar to that of the vehicle 100 according to the embodiments 1 to 4 of the present invention described above. Thus, the same reference signs indicate the configuration same as that of the vehicle 100 according to the embodiments 1 to 4, and a description thereof is omitted. The specific configurations of the vehicles 100 other than the vehicle 100 at the head of a first train 61a are omitted from FIG. 14.

According to the present embodiment, the vehicle system 60 includes a centralized management system 10 as a host system for the vehicle 100.

The vehicle integrated management system 2 according to the present embodiment includes a communication device that enables the cooperation with the vehicle integrated management systems 2 included in the vehicles 100 of other trains 61 through the centralized management system 10. The communication device of the vehicle integrated management system 2 may include, for example, a wireless terminal device or a cellular phone terminal device.

The centralized management system 10 is installed in, for example, a station. The centralized management system 10 may include a computer equipped with a processor such as a CPU, a memory device such as a DRAM and a hard disk device, an input device such as a mouse and a keyboard, an output device such as a display, and a communication device such as a network interface.

The vehicle integrated management system 2 transmits the information related to the power consumption of the own vehicle 100 to the centralized management system 10 through the communication network 9. The vehicle integrated management system 2 receives the information, which is transmitted from the centralized management system 10 through the communication network, related to the control determined on the basis of the power consumption of the vehicles 100 of other trains 61. This allows the cooperation with the vehicles 100 of other trains 61.

The centralized management system 10 collects information (hereinafter also referred to as "power consumption information" related to the power consumption of the vehicle 100 of each train 61. For a possible regeneration lapse that is determined for any train 61 on the basis of the collected power consumption information, the centralized management system 10 increases the output command value for the air conditioner 6 in consideration of the energy saving if the air conditioners 6 in the vehicles 100 of the trains 61 surrounding such train 61 allow a margin for increase in output.

For the power saving that is requested due to any surrounding train 61 in power running, the centralized management system 10 decreases the output command value for the air conditioner 6 in consideration of power saving if the air conditioners 6 in the vehicles 100 of other trains 61 surrounding such train 61 allow a margin for decrease in output. The margins for increase and decrease in output of the air conditioner 6 are determined from the difference between the vehicle interior temperature and the vehicle-interior-temperature lower-limit value and from the difference between the vehicle interior temperature and the vehicle-interior-temperature upper-limit value.

For the power saving that is requested due to, for example, the first train 61a in power running, if the air conditioners 6 of other trains 61 surrounding the first train 61a, in other words, the air conditioners 6 in the vehicles 100 of a second train 61b and a third train 61c allow a margin for decrease in output, the centralized management system 10 decreases the output command for the air conditioners 6 in the vehicles 100 of the second train 61b and the third train 61c.

The centralized management system 10, which includes a feeding voltage predicting unit for detecting or predicting the feeding voltage, may be configured to decrease the output command value for the air conditioner 6 for a possibility that the feeding voltage falls below the feeding-voltage lower-limit value and to increase the output command value for the air conditioner 6 for a possibility that the feeding voltage exceeds the feeding-voltage upper-limit value. This configuration can stabilize the feeding voltage.

In addition to the vehicle interior comfort, the energy saving, and the power saving of the own vehicle 100 by itself, the present embodiment described above provides, through cooperation with other trains 61 surrounding the train 61 that include the own vehicles 100, the operation control or the operation plan for the air conditioner 6 that is capable of improving the energy saving and the power saving as the entire train system 60 including the surrounding trains 61.

According to the present embodiment, each of the vehicles 100 includes the air conditioning control device 1 according to the embodiment 1 shown in FIGS. 1 and 2 described above. Alternatively, each of the vehicles 100 may include the air conditioning control device 1A according to the embodiment 2 shown in FIG. 6 described above, the air conditioning control device 1B according to the embodiment 3 shown in FIG. 9 described above, or the air conditioning control device 1C according to the embodiment 4 shown in FIG. 12 described above. The vehicle 100 including the air conditioning control device 1A according to the embodiment 2, the air conditioning control device 1B according to the embodiment 3, or the air conditioning control device 1C according to the embodiment 4 provides the effect similar to that of the vehicle 100 including the air conditioning control device 1 according to the embodiment 1.

Embodiment 6

The embodiments 1 to 5 described above have referred to the air conditioning control devices 1, 1A, 1B, and 1C with consideration given to the comfort of the vehicle 100, the energy saving, and the power saving. An embodiment 6 of the present invention refers to the configuration that includes a storage battery 11 mounted on the vehicle 100, thereby being capable of providing an improvement in the comfort, the energy saving, and the power saving.

Figure 15:
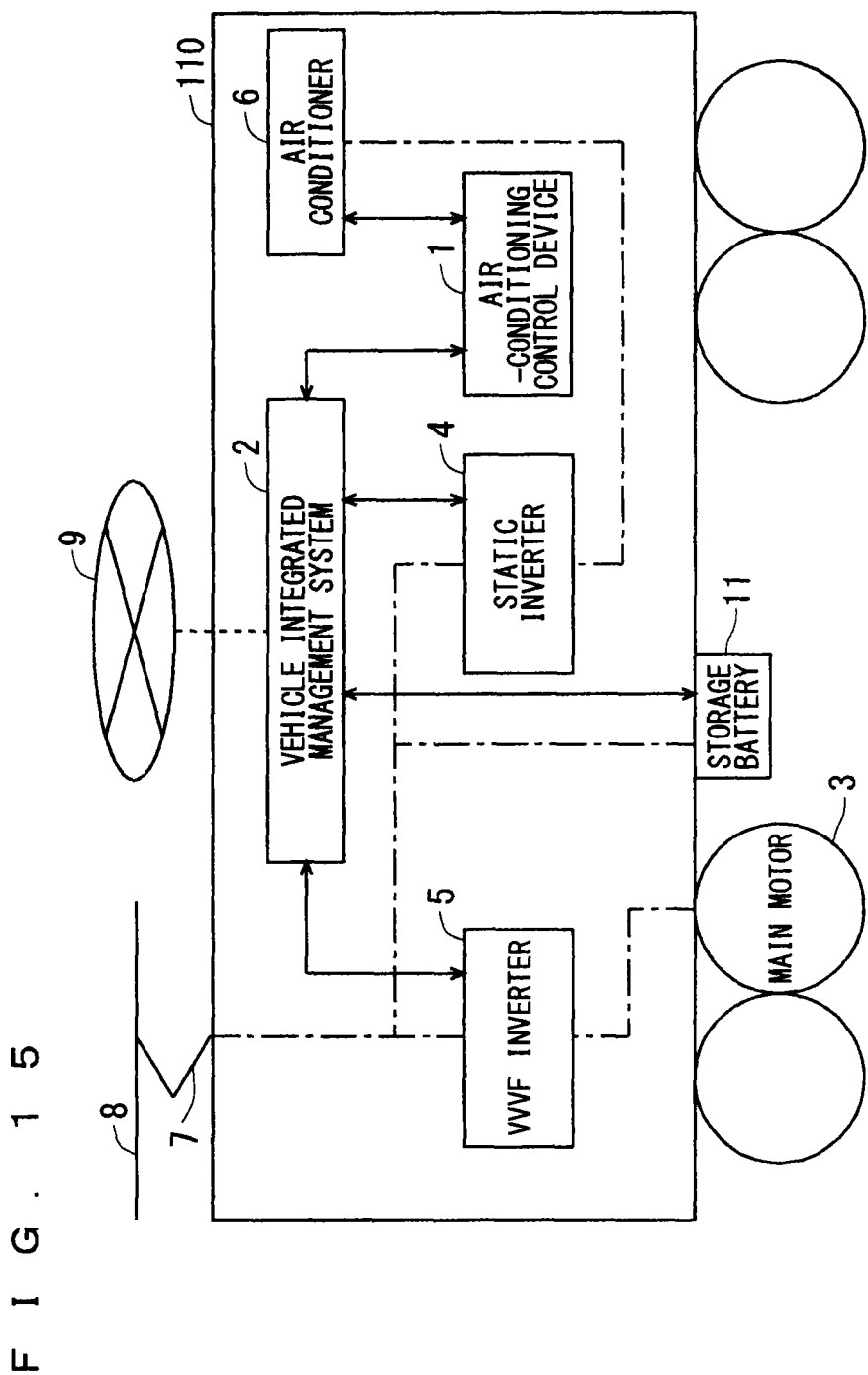
FIG. 15 A block diagram showing a configuration of a vehicle 110 including the air conditioning control device 1 and a storage battery 11 according to an embodiment 6 of the present invention.

FIG. 15 is a block diagram showing a configuration of a vehicle 110 including the air conditioning control device 1 and the storage battery 11 according to the embodiment 6 of the present invention. As the vehicle 110 according to the present embodiment, the configuration of the vehicle 100 according to the embodiments 1 to 5 described above further includes the storage battery 11. The vehicle 110 according to the present embodiment has the configuration similar to that of the vehicle 100 according to the embodiments 1 to 5. Thus, the same reference signs indicate the configuration same as that of the vehicle 100 according to the embodiments 1 to 5, and a description thereof is omitted.

The storage battery 11 is capable of charging and discharging in accordance with the output command provided by the vehicle integrated management system 2 on the basis of the power consumption of the vehicle 110.

During regeneration, if the air conditioner 6 allows a margin for increase in output, the vehicle integrated management system 2 increases the output command value Qs for the air conditioner 6 included in the air conditioning control device 1 such that the regeneration electric power is consumed. For a possibility that a regeneration lapse occurs, the vehicle integrated management system 2 charges the storage battery 11 with regenerative electric power if the storage battery 11 can afford charging, in other words, if there is a room for charging in the storage battery 11.

During power running, the vehicle integrated management system 2 decreases the output command value Qs for the air conditioner 6 included in the air conditioning control device 1 so as to suppress the power consumption if the air conditioner 6 allows a margin for decrease in output. Under the power consumption constraints caused by, for example, a request for power saving, the vehicle integrated management system 2 causes the storage battery 11 to discharge and thus suppresses the power consumption if the storage battery 11 can afford discharging, in other words, if the storage battery 11 has electric power that can be discharged.

Thus, according to the present embodiment, the vehicle 110 includes the storage battery 11. In cooperation with the storage battery 11, the air conditioning control device 1 can perform the operation control for the air conditioner 6. Consequently, the air conditioning control device 1 is capable of performing the operation control for the air conditioner 6, providing an improvement in the energy saving and the power saving.

According to the present embodiment, the vehicle 110 includes the air conditioning control device 1 according to the embodiment 1 shown in FIGS. 1 and 2 described above. Alternatively, the vehicle 110 may include the air conditioning control device 1A according to the embodiment 2 shown in FIG. 6 described above, the air conditioning control device 1B according to the embodiment 3 shown in FIG. 9 described above, or the air conditioning control device 1C according to the embodiment 4 shown in FIG. 12 described above. The vehicle 110 including the air conditioning control device 1A according to the embodiment 2, the air conditioning control device 1B according to the embodiment 3, or the air conditioning control device 1C according to the embodiment 4 provides the effect similar to the vehicle 110 including the air conditioning control device 1 according to the embodiment 1. That is, the air conditioning control devices 1A, 1B and 1C can perform the operation control or the operation planning for the air conditioner model 49 in cooperation with the storage battery 11. Consequently, the air conditioning control devices 1A, 1B and 1C are capable of performing the operation control or the operation planning for the air conditioner model 49, providing an improvement in the energy saving and the power saving.

Embodiment 7

The embodiments 1 to 5 described above have referred to the air conditioning control devices 1, 1A, 1B, and 1C with consideration given to the comfort of the vehicle 100, the energy saving, and the power saving. An embodiment 7 of the present invention refers to the configuration, which includes a heat storage device 12 mounted on the vehicle 100, capable of providing an improvement in the comfort, the energy saving, and the power saving.

Figure 16:
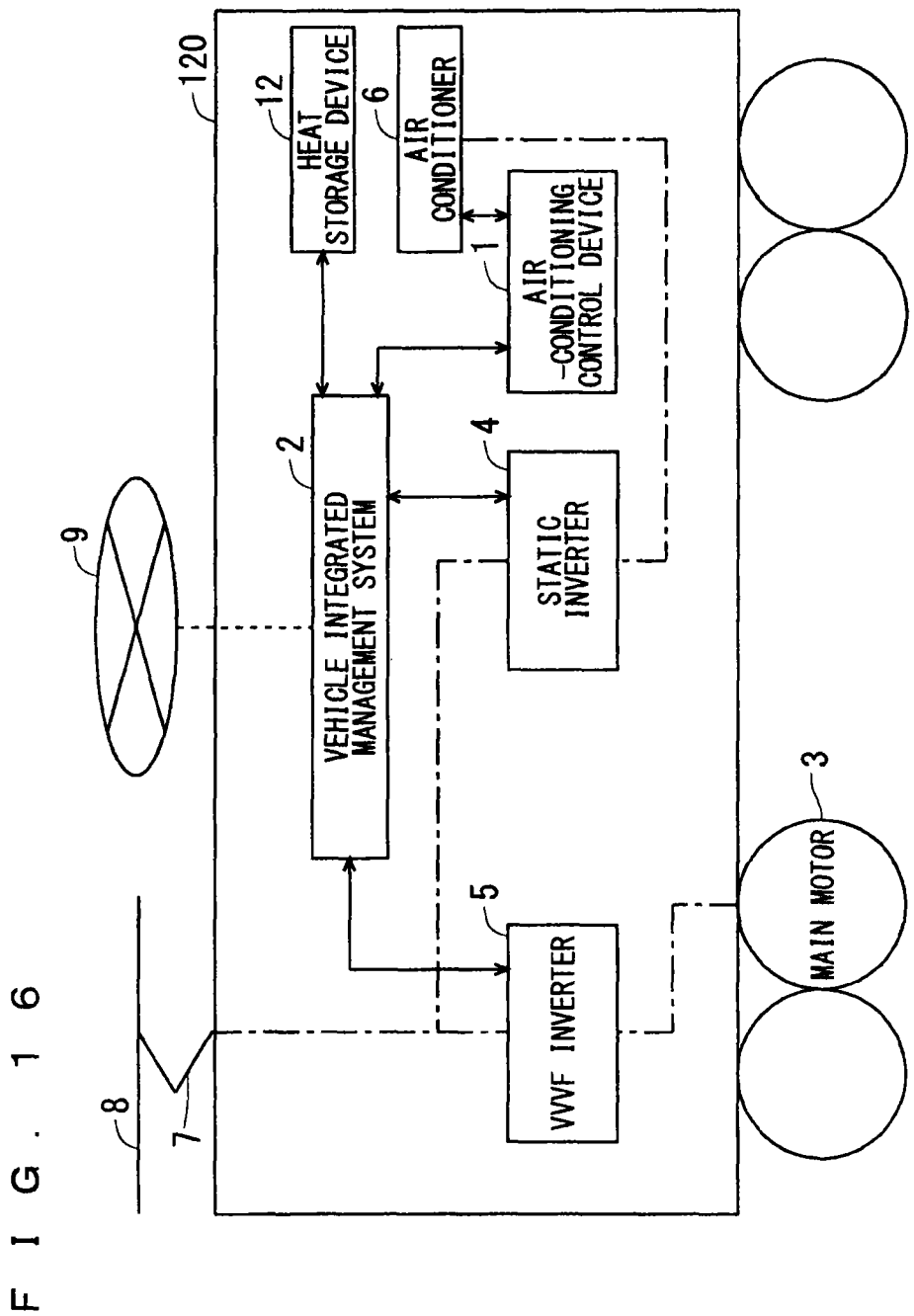
FIG. 16 A block diagram showing a configuration of a vehicle 120 including the air conditioning control device 1 and a heat storage device 12 according to an embodiment 7 of the present invention.

FIG. 16 is a block diagram showing a configuration of a vehicle 120 including the air conditioning control device 1 and the heat storage device 12 according to the embodiment 7 of the present invention. As the vehicle 120 according to the present embodiment, the configuration of the vehicle 100 according to the embodiments 1 to 5 described above further includes the heat storage device 12. The vehicle 120 according to the present embodiment has the configuration similar to that of the vehicle 100 according to the embodiments 1 to 5. Thus, the same reference signs indicate the configuration same as that of the vehicle 100 according to the embodiments 1 to 5, and a description thereof is omitted.

The heat storage device 12 is capable of storing and dissipating heat in accordance with the output command provided by the vehicle integrated management system 2 on the basis of the power consumption of the vehicle 120. According to the present embodiment, "store heat" means to store cool air and "dissipate heat" means to dissipate cool air while the air conditioner 6 operates in the cooling mode.

Instead of the additional installment of the heat storage device 12, for example, a part of the air conditioner 6 may serve as the heat storage device 12 if the heat storage capacity through refrigerant can be increased by a larger amount of refrigerant in a longer refrigerant pipe of the air conditioner 6. In this case, turning up the operation of the outdoor unit of the air conditioner 6 and turning down the operation of the indoor unit of the air conditioner 6 allow the heat storage device 12 to store heat. Turning down the operation of the outdoor unit of the air conditioner 6 and turning up the operation of the indoor unit of the air conditioner 6 allow the heat storage device 12 to dissipate heat.

During regeneration, if the air conditioner 6 allows a margin for increase in output, the vehicle integrated management system 2 increases the output command value Qs for the air conditioner 6 included in the air conditioning control device 1 such that the regenerative electric power is consumed within a range not lower than the vehicle-interior-temperature lower-limit value.

For a possibility that a regeneration lapse occurs, the vehicle integrated management system 2 increases the output command value Qs for the air conditioner included in the air conditioning control device 1 and causes the heat storage device 12 to store heat if the heat storage device 12 can afford heat storage, in other words, if there is a room for heat storage in the heat storage device 12. Alternatively, turning up the operation of the outdoor unit of the air conditioner 6 and turning down the operation of the indoor unit of the air conditioner 6 allow the heat storage device 12 to store heat.

During power running, the vehicle integrated management system 2 decreases the output command value Qs for the air conditioner 6 included in the air conditioning control device 1 so as to suppress the power consumption within a range not exceeding the vehicle-interior-temperature upper-limit value if the air conditioner 6 allows a margin for decrease in output. Under the power consumption constraints caused by, for example, a request for power saving, the vehicle integrated management system 2 causes the heat storage device 12 to dissipate heat and thus suppresses the power consumption if the heat storage device 12 can afford heat dissipation, in other words, if the heat storage device 12 has an amount of heat that can be dissipated. Alternatively, turning down the operation of the outdoor unit of the air conditioner 6 and turning up the operation of the indoor unit of the air conditioner 6 allow the heat storage device 12 to dissipate heat.

Thus, according to the present embodiment, the vehicle 120 includes the heat storage device 12. In cooperation with the heat storage device 12, the air conditioning control device 1 can perform the operation control for the air conditioner 6. Consequently, the air conditioning control device 1 is capable of performing the operation control for the air conditioner 6, providing an improvement in the energy saving and the power saving.

According to the present embodiment, the vehicle 120 includes the air conditioning control device 1 according to the embodiment 1 shown in FIGS. 1 and 2 described above. Alternatively, the vehicle 120 may include the air conditioning control device 1A according to the embodiment 2 shown in FIG. 6 described above, the air conditioning control device 1B according to the embodiment 3 shown in FIG. 9 described above, or the air conditioning control device 1C according to the embodiment 4 shown in FIG. 12 described above.

The vehicle 120 including the air conditioning control device 1A according to the embodiment 2, the air conditioning control device 1B according to the embodiment 3, or the air conditioning control device 1C according to the embodiment 4 in place of the air conditioning control device 1 according to the embodiment 1 provides the effect similar to that of the vehicle 120 including the air conditioning control device 1 according to the embodiment 1.

In particular, the air conditioning control devices 1A, 1B, and 1C can perform the operation control or the operation planning for the air conditioner model 49 in cooperation with the heat storage device 12. Consequently, the air conditioning control devices 1A, 1B, and 1C are capable of performing the operation control or the operation planning for the air conditioner model 49, providing an improvement in the energy saving and the power saving.

Similarly to the vehicle 110 according to the embodiment 6 shown in FIG. 15 described above, the vehicle 120 according to the present embodiment may include the storage battery 11 in addition to the heat storage device 12. The vehicle 120 including the storage battery 11 provides the effect similar to that of the vehicle 110 according to the embodiment 6.

Embodiment 8

In the train system 60 according to the embodiment 5 shown in FIG. 14 described above, the output command value Qs for the air conditioner 6 is increased in advance with consideration given to an increase in the vehicle interior temperature resulting from the opening of the doors on arrival in the station. In this case, the increase in the vehicle interior temperature, in other words, the thermal load resulting from the opening of the doors is difficult to predict. Thus, an embodiment 8 according to the present invention refers to the air conditioning control device that corrects the thermal load prediction on the basis of the information on a preceding train or of the past track records. The "preceding train" refers to a train that runs, in the direction of travel of the own vehicle 100, ahead of the train to which the own vehicle 100 belongs.

The train system according to the present embodiment has the configuration similar to that of the train system 60 according to the embodiment 5 shown in FIG. 14. Thus, the same reference signs indicate the configuration same as that of the train system 60 according to the embodiment 5, and an illustration thereof and an overlapping description are omitted. According to the present embodiment, the vehicle integrated management system 2 included in the vehicle 100 of each train 61 is capable of communicating with the centralized management system 10 through the communication network 9.

In a case where the vehicle 100 of the preceding train that runs, in the direction of travel of the own vehicle 100, ahead of the train to which the own vehicle 100 belongs has the vehicle interior temperature Tin that falls below the vehicle-interior-temperature lower-limit value Tmin or exceeds the vehicle-interior-temperature upper-limit value Tmax, the vehicle 100 of the preceding train causes the vehicle integrated management system 2 to transmit the information on the unsuccessful thermal load predictions for the vehicle 100 of the preceding train to the centralized management system 10.

The centralized management system 10 transmits the information indicating that the vehicle interior temperature Tin of the preceding train falls below the vehicle-interior-temperature lower-limit value Tmin or exceeds the vehicle-interior-temperature upper-limit value Tmax to the vehicle integrated management system 2 of the vehicle 100 of the following train that runs behind the preceding train.

In determining that, on the basis of the information received from the centralized management system 10, the vehicle 100 of the preceding train has the vehicle interior temperature Tin below the vehicle-interior-temperature lower-limit value, the following train determines that the thermal load Q of the vehicle 100 of the preceding train has been over estimated, and thus decreases the thermal load Q of the vehicle 100 of the following train, in other words, of the own train. The margin for decrease in the thermal load Q is decided depending on the extent to which the thermal load of the vehicle 100 of the preceding train is overestimated.

In determining that the vehicle 100 of the preceding train has the vehicle interior temperature Tin over the vehicle-interior-temperature upper-limit value, the following train determines that the thermal load Q of the vehicle 100 of the preceding train has been underestimated, and thus increases the thermal load Q of the vehicle 100 of the following train, in other words, of the own train. The margin for increase in the thermal load Q is decided depending on the extent to which the thermal load of the vehicle 100 of the preceding train is underestimated.

Thus, according to the present embodiment, the air conditioning control device 1 in the vehicle 100 of the following train provides an improvement in the vehicle interior comfort of the vehicle 100 of the following train on the basis of the vehicle interior comfort of the vehicle 100 of the preceding train.

According to the present embodiment, the vehicle 100 includes the air conditioning control device 1 according to the embodiment 1 shown in FIGS. 1 and 2 described above. Alternatively, the vehicle 100 may include the air conditioning control device 1A according to the embodiment 2 shown in FIG. 6 described above, the air conditioning control device 1B according to the embodiment 3 shown in FIG. 9 described above, or the air conditioning control device 1C according to the embodiment 4 shown in FIG. 12 described above. The vehicle 100 including the air conditioning control device 1A according to the embodiment 2, the air conditioning control device 1B according to the embodiment 3, or the air conditioning control device 1C according to the embodiment 4 in place of the air conditioning control device 1 according to the embodiment 1 provides the effect similar to that of the vehicle 100 including the air conditioning control device 1 according to the embodiment 1.

Embodiment 9

According to the embodiments 1 to 8 of the present invention, attention has been directed to the use of the regenerative brake during deceleration. When the braking force only by the regenerative brake is actually insufficient, the vehicles 100, 110, and 120 use an air brake to decelerate. The air brake is made available by storing compressed air in an air storage tank.

The compressed air is generated while the vehicle is running from one station to another station. During the generation of compressed air, the electric power supply to the compressor for providing compressed air increases, which decreases the electric power supply to the compressor of the air conditioner 6. Thus, an embodiment 9 of the present invention refers to the air conditioning control device with consideration given to the use of the air brake.

Figure 17:
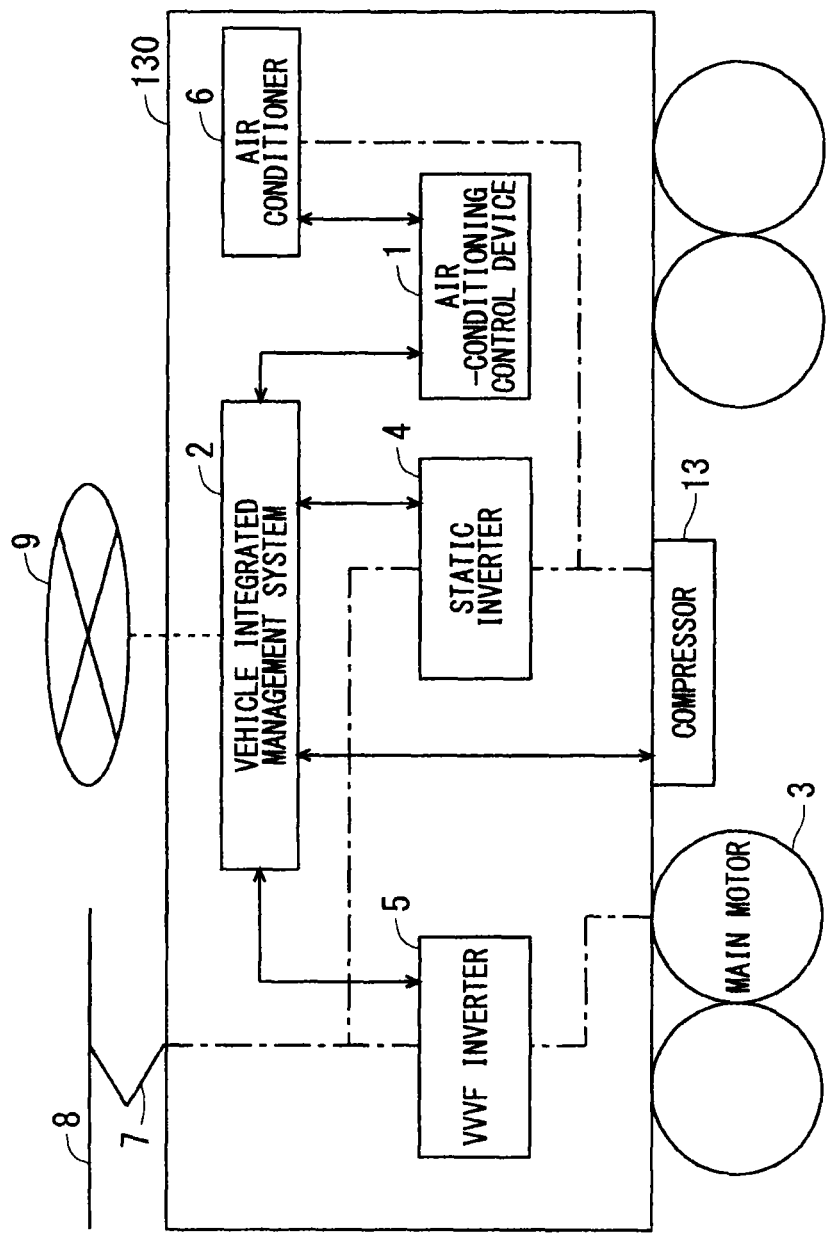
FIG. 17 A block diagram showing a configuration of a vehicle 130 including the air conditioning control device 1 and a compressor 13 according to an embodiment 9 of the present invention.

FIG. 17 is a block diagram showing a configuration of a vehicle 130 including the air conditioning control device 1 and a compressor 13 according to the embodiment 9 of the present invention. As the vehicle 130 according to the present embodiment, the configuration of the vehicle 100 according to the embodiments 1 to 5 described above further includes the compressor 13 for providing compressed air to be used by the air brake. The vehicle 130 according to the present embodiment has the configuration similar to that of the vehicle 100 according to the embodiments 1 to 5. Thus, the same reference signs indicate the configuration same as that of the vehicle 100 according to the embodiments 1 to 5, and a description thereof is omitted.

The vehicle 130 according to the present embodiment is configured such that the vehicle integrated management system 2 and the compressor 13 work in cooperation to transmit and receive information.

When the pressure of the compressed air for the air brake in the vehicle 100 according to the embodiments 1 to 5 falls within the acceptable range, the vehicle integrated management system 2 of the vehicle 130 according to the present embodiment operates as described below. For a possibility that a regenerative lapse occurs, the vehicle integrated management system 2 causes the compressor 13 to actively generate compressed air for the air brake in order to increase the power consumption in the vehicle 130. During power running, the vehicle integrated management system 2 causes the compressor 13 to suppress the generation of compressed air for the air brake in order to decrease the power consumption in the vehicle 130.

In cooperation with the centralized management system 10 shown in FIG. 14 described above, the vehicle integrated management system 2 is capable of exchanging information related to the power consumption of the own vehicle 130 with the surrounding trains. When the pressure of the compressed air for the air brake falls within the acceptable range, the vehicle integrated management system 2 operates as described below. For a possibility that a regenerative lapse occurs in any surrounding train, the vehicle integrated management system 2 causes the compressor 13 to generate compressed air for the air brake with consideration given to the energy saving. For the power saving that is requested due to a surrounding train in power running, the vehicle integrated management system 2 causes the compressor 13 to suppress the generation of compressed air for the air brake with consideration given to the power saving.

Thus, according to the present embodiment, decisions are made on the output of the air conditioner 6 and on the generation of the compressed air for the air brake through the compressor 13 on the basis of, for example, the vehicle interior thermal load, the power-running/regenerative electric power, the next-station passenger load factor, and the set temperatures. Consequently, even with the generation of the compressed air for the air brake through the compressor 13, the air conditioning control device 1 is capable of performing the operation control for the air conditioner 6 with consideration given not only to the vehicle interior comfort but also the energy saving and the power saving.

According to the present embodiment, the vehicle 130 includes the air conditioning control device 1 according to the embodiment 1 shown in FIGS. 1 and 2 described above. Alternatively, the vehicle 100 may include the air conditioning control device 1A according to the embodiment 2 shown in FIG. 6 described above, the air conditioning control device 1B according to the embodiment 3 shown in FIG. 9 described above, or the air conditioning control device 1C according to the embodiment 4 shown in FIG. 12 described above. The vehicle 130 including the air conditioning control device 1A according to the embodiment 2, the air conditioning control device 1B according to the embodiment 3, or the air conditioning control device 1C according to the embodiment 4 in place of the air conditioning control device 1 according to the embodiment 1 provides the effect similar to that of the air conditioning control device 1 according to the embodiment 1.

The vehicle integrated management system 2, which includes a feeding voltage predicting unit for detecting or predicting the feeding voltage, may be configured to cause the compressor 13 to generate compressed air for a possibility that the feeding voltage falls below the feeding-voltage lower-limit value and to cause the compressor 13 to suppress the generation of compressed air for a possibility that the feeding voltage exceeds the feeding-voltage upper-limit value. This configuration can stabilize the feeding voltage.

Similarly to the vehicle 110 according to the embodiment 6 shown in FIG. 15 described above, the vehicle 130 according to the present embodiment may include the storage battery 11 in addition to the compressor 13. The vehicle 130 including the storage battery 11 provides the effect similar to that of the vehicle 110 according to the embodiment 6.

Similarly to the vehicle 120 according to the embodiment 7 shown in FIG. 16 described above, the vehicle 130 according to the present invention may include the heat storage device 12. The vehicle 130 including the heat storage device 12 provides the effect similar to that of the vehicle 120 according to the embodiment 7.

Embodiment 10

According to an embodiment 10 of the present invention, the vehicle integrated management system 2 of each of the vehicles 100, 110, 120, and 130 described above includes an another-train-presence predicting unit that predicts, on the basis of the travel plan databases 32 and 52 according to the embodiments 1 to 9, the number of trains surrounding the trains to which the own vehicles 100, 110, 120, and 130 belong.

During the power running of the trains to which the own vehicles 100, 110, 120, and 130 belong, when the another-train-presence predicting unit of the vehicle integrated management system 2 predicts the presence of a surrounding train in regeneration, the regenerative electric power is less likely to be consumed through the power running. Thus, the air conditioning output calculating unit 29 in each of the air conditioning control devices 1, 1A, 1B, and 1C corrects the output command value for the air conditioner 6 to prevent a decrease in the output of the air conditioner 6 in the own vehicles 100, 110, 120, and 130.

During the regeneration of the trains to which the own vehicles 100, 110, 120, and 130 belong, when the another-train-presence predicting unit of the vehicle integrated management system 2 predicts the presence of a surrounding train in power running, the regenerative lapse is less likely to occur. Thus, the air conditioning output calculating unit 29 in each of the air conditioning control devices 1, 1A, 1B, and 1C corrects the output command value for the air conditioner 6 to prevent an increase in the output of the air conditioner 6 in the own vehicles 100, 110, 120, and 130.

When the another-train-presence predicting unit of the vehicle integrated management system 2 predicts the presence of a relatively large number of surrounding trains, the air conditioning output calculating unit 29 in each of the air conditioning control devices 1, 1A, 1B, and 1C operates as follows.

During the power running of the trains to which the own vehicles 100, 110, 120, and 130 belong, there is a strong possibility of the presence of a surrounding train in regeneration, so that the air conditioning output calculating unit 29 in each of the air conditioning control devices 1, 1A, 1B, and 1C corrects the output command value for the air conditioner 6 to prevent a decrease in the output of the air conditioner 6 in the own vehicle 100, 110, 120, and 130. During the regeneration of the train to which the own vehicle 100, 110, 120, and 130 belongs, there is a strong possibility of the presence of a surrounding train in power running, so that the air conditioning output calculating unit 29 in each of the air conditioning control devices 1, 1A, 1B, and 1C corrects the output command value for the air conditioner 6 to prevent an increase in the output of the air conditioner 6 in the own vehicle 100, 110, 120, and 130.

When the another-train-presence predicting unit of the vehicle integrated management system 2 predicts the presence of few surrounding trains running, the air conditioning output calculating unit 29 in each of the air conditioning control devices 1, 1A, 1B, and 1C operates as follows.

As described in the embodiments 1 to 9, during the power running of the trains to which the own vehicles 100, 110, 120, and 130 belong, the air conditioning output calculating unit 29 in each of the air conditioning control devices 1, 1A, 1B, and 1C corrects the output command value for the air conditioner 6 to decrease the output of the air conditioner 6 in each of the own vehicles 100, 110, 120, and 130. During the regeneration of the trains to which the own vehicles 100, 110, 120, and 130 belong, the air conditioning output calculating unit 29 in each of the air conditioning control devices 1, 1A, 1B, and 1C corrects the output command value for the air-conditioner 6 to increase the output of the air conditioner 6 in the own vehicle 100, 110, 120, and 130.

Thus, according to the present embodiment, the air conditioning output calculating unit 29 corrects the output command value for the air conditioner 6 on the basis of the number of surrounding trains and of the degree of congestion of the trains. This prevents an excessive decrease in the output of the air conditioner 6 during power running and an excessive increase in the output of the air conditioner 6 during regeneration in the own vehicles 100, 110, 120, and 130. Consequently, an improvement in comfort can be provided while the effects of the energy saving and the power saving are maintained.

Embodiment 11

The embodiments 1 to 10 have been described without consideration of the opening and closing of the doors. Alternatively, according to the embodiment 11 of the present invention, the vehicle integrated management system 2 of each of the vehicle 100, the vehicle 110, the vehicle 120, and the vehicle 130 described above includes a door opening-and-closing unit that controls the opening and closing of the doors. The door opening-and-closing unit changes the number of doors to be opened and closed depending on the number of users for each time period or on the number of users for each station.

The opening of the doors during the stoppage at the station is assumed to cause a significantly large heat inflow. In a case where the train arrives in a station with a relatively small number of users at a time period with a relatively small number of users, the door opening-and-closing unit reduces the number of doors to be opened and closed to such an extent that the convenience is not largely affected.

The reduction in the number of doors to be opened and closed decreases the amount of heat inflow and thus suppresses the vehicle interior temperature change, resulting in an improvement in comfort. The reduction in the amount of heat inflow suppresses the output of the air conditioner 6, resulting in energy saving and power saving.

Thus, according to the present embodiment, the door opening-and-closing unit changes the number of doors to be opened and closed depending on the number of users for each time period or on the number of users for each station. Thus, the amount of heat inflow caused by the opening and closing of the doors is reduced, which provides enhanced energy saving and power saving and further improved comfort in addition to the effects provided by the embodiments 1 to 10.

While the invention has been shown and described in detail, the foregoing description is in all aspects illustrative and not restrictive. It is therefore understood that numerous modifications and variations can be devised without departing from the scope of the invention.

EXPLANATION OF REFERENCE SIGNS 1, 1A, 1B, 1C vehicle air conditioning control device (air conditioning control device), 2 vehicle integrated management system, 3 main motor, 4 static inverter, 5 VVVF inverter, 6 air conditioner, 7 pantograph, 8 feeder, 9 communications network, 10 centralized management system, 11 storage battery, 12 heat storage device, 13 compressor, 21 target environment condition setter, 22 vehicle interior environment detector, 23 vehicle exterior environment detector, 24 vehicle condition detector, 25 vehicle condition predicting unit, 26 thermal load calculating unit, 27 power-running/regenerative electric power predicting unit, 28 feeding voltage detector, 29 air conditioning output calculating unit, 30, 50, air conditioning controller, 31, 51 past passenger-load-factor database, 32, 52 travel plan database, 41 target environment condition setter, 42 vehicle interior environment predicting unit, 43 vehicle exterior environment predicting unit, 44 vehicle condition predicting unit, 45 thermal load predicting unit, 46 power-running/regenerative electric power predicting unit, 47 feeding voltage predicting unit, 48 air conditioning output planning unit, 49 air conditioner model, 60 train system, 61, 61a, 61b, 61c train, 100, 110, 120, 130 vehicle.

The invention claimed is:

1. A vehicle air conditioning control device to be included in a vehicle to control an air conditioner in said vehicle, said device comprising:
a target environment condition setter that inputs target environment conditions including a vehicle-interior-temperature set value, a vehicle-interior-temperature upper-limit value, and a vehicle-interior-temperature lower-limit value that are predetermined;
a vehicle interior environment detector that detects a vehicle interior environment including a vehicle interior temperature and a vehicle interior humidity;
a vehicle exterior environment detector that detects a vehicle exterior environment including a vehicle exterior temperature being a temperature of the outside of said vehicle;
a vehicle condition detector that detects vehicle conditions including a position, a passenger load factor, and power-running/regenerative electric power of said vehicle;
a vehicle condition predicting unit that predicts an acceleration at or after a prediction time point, a velocity at or after the prediction time point, a slope at or after the prediction time point, and the passenger load factor at or after the prediction time point of said vehicle on the basis of a travel plan and passenger-load-factor information indicating a past passenger load factor of said vehicle;
a thermal load calculating unit that calculates a thermal load in said vehicle on the basis of said vehicle interior temperature and said vehicle interior humidity that are detected by said vehicle interior environment detector, said vehicle exterior temperature that is detected by said vehicle exterior environment detector, said passenger load factor that is detected by said vehicle condition detector, and said vehicle-interior-temperature set value that is input by said target environment condition setter;
a power-running/regenerative electric power predicting unit that predicts the power-running/regenerative electric power at or after said prediction time point on the basis of the acceleration at or after said prediction time point, the velocity at or after said prediction time point, the slope at or after said prediction time point, and the passenger load factor at or after said prediction time point of said vehicle that are predicted by said vehicle condition predicting unit;

an air conditioning output calculating unit that calculates an output command value for said air conditioner on the basis of said vehicle-interior-temperature upper-limit value and said vehicle-interior-temperature lower-limit value that are input by said target environment condition setter, said thermal load that is calculated by said thermal load calculating unit, said power-running/regenerative electric power that is detected by said vehicle condition detector, the power-running/regenerative electric power at or after said prediction time point that is predicted by said power-running/regenerative electric power predicting unit, and the passenger load factor at or after said prediction time point that is predicted by said vehicle condition predicting unit; and an air conditioning controller that controls an output of said air conditioner on the basis of the output command value for said air conditioner that is calculated by said air conditioning output calculating unit, wherein said air conditioning output calculating unit corrects the output command value for said air conditioner on the basis of said power-running/regenerative electric power that is detected by said vehicle condition detector, the power-running/regenerative electric power at or after said prediction time point that is predicted by said power-running/regenerative electric power predicting unit, and the passenger load factor at or after said prediction time point that is predicted by said vehicle condition predicting unit.

2. The vehicle air conditioning control device according to claim 1, comprising a feeding voltage detector that detects a feeding voltage, wherein said air conditioning output calculating unit corrects the output command value for said air conditioner on the basis of said power-running/regenerative electric power that is detected by said vehicle condition detector, the power-running/regenerative electric power at or after said prediction time point that is predicted by said power-running/regenerative electric power predicting unit, the passenger load factor at or after said prediction time point that is predicted by said vehicle condition predicting unit, and said feeding voltage that is detected by said feeding voltage detector.

3. The vehicle air conditioning control device according to claim 1, further comprising an air conditioner model that models input and output characteristics of said air conditioner, wherein said vehicle interior environment detector has a function as a vehicle interior environment predicting unit that predicts said vehicle interior environment including said vehicle interior temperature and said vehicle interior humidity on the basis of said thermal load calculated by said thermal load calculating unit and an output of said air conditioner model, said vehicle exterior environment detector has a function as a vehicle exterior environment predicting unit that predicts said vehicle exterior environment including said vehicle exterior temperature, said vehicle condition detector has a function as a vehicle condition predicting unit that predicts said vehicle conditions including the acceleration at or after said prediction time point, the velocity at or after said prediction time point, the slope at or after said prediction time point, the passenger load factor at or after said prediction time point, and the power-running/regenerative electric power at or after said prediction time point on the basis of the travel plan and past passenger-load-factor information of said vehicle, said thermal load calculating unit has a function as a thermal load predicting unit that predicts said thermal load at or after the prediction time point and an operation mode of said air conditioner on the basis of said vehicle interior temperature and said vehicle interior humidity that are detected by said vehicle interior environment detector, said vehicle exterior temperature that is detected by said vehicle exterior environment detector, said passenger load factor that is detected by said vehicle condition detector, and said vehicle-interior-temperature set value that is input by said target environment condition setter, said power-running/regenerative electric power predicting unit has a function as a power-running/regenerative electric power predicting unit that predicts the power-running/regenerative electric power at or after said prediction time point on the basis of the acceleration at or after said prediction time point, the velocity at or after said prediction time point, the slope at or after said prediction time point, and the passenger load factor at or after said prediction time point that are predicted by said vehicle condition predicting unit, said air conditioning output calculating unit has a function as an air conditioning output planning unit that plans the output command value for said air conditioner on the basis of said vehicle-interior-temperature upper-limit value and said vehicle-interior-temperature lower-limit value that are input by said target environment condition setter, said thermal load at or after said prediction time point that is predicted by said thermal load calculating unit, said power-running/regenerative electric power that is detected by said vehicle condition detector, the power-running/regenerative electric power at or after said prediction time point that is predicted by said power-running/regenerative electric power predicting unit, and the passenger load factor at or after said prediction time point that is predicted by said vehicle condition predicting unit, said air conditioning controller has a function of controlling the output of said air conditioner model on the basis of the output command value for said air conditioner that is planned by said air conditioning output planning unit, and said air conditioning output planning unit corrects the output command value for said air conditioner on the basis of said power-running/regenerative electric power that is detected by said vehicle condition detector, the power-running/regenerative electric power at or after said prediction time point that is predicted by said power-running/regenerative electric power predicting unit, and the passenger load factor at or after said prediction time point that is predicted by said vehicle condition predicting unit.

4. The vehicle air conditioning control device according to claim 3, comprising a feeding voltage predicting unit that predicts a feeding voltage on the basis of said travel plan, wherein said air conditioning output calculating unit corrects the output command value for said air conditioner on the basis of said power-running/regenerative electric power that is detected by said vehicle condition detector, the power-running/regenerative electric power at or after said prediction time point that is predicted by said power-running/regenerative electric power predicting unit, the passenger load factor at or after said prediction time point that is predicted by said vehicle condition predicting unit, and said feeding voltage that is predicted by said feeding voltage predicting unit.

5. The vehicle air conditioning control device according to claim 1, wherein
said vehicle includes a communication device capable of communicating with a host system capable of communicating with a plurality of vehicles,
information related to the output command value for said air conditioner that is calculated by said air conditioning output calculating unit is transmitted to said host system along with power consumption of each of said vehicles,
said host system corrects the output command value for said air conditioner of each of said vehicles,
said host system transmits a correction value of the output command value for said air conditioner to each of said vehicles, and
said air conditioning output calculating unit corrects the output command value for said air-conditioner on the basis of said correction value received from said host system.

6. The vehicle air conditioning control device according to claim 1, wherein said vehicle includes a storage battery.

7. The vehicle air conditioning control device according to claim 1, wherein said vehicle includes a heat storage device.

8. The vehicle air conditioning control device according to claim 1, wherein said air conditioning output calculating unit corrects a predicted value of said thermal load on the basis of a predicted value of the thermal load of another vehicle running ahead of a following vehicle.

9. The vehicle air conditioning control device according to claim 1, wherein said vehicle includes a compressor that generates compressed air for an air brake.

10. The vehicle air conditioning control device according to claim 1, wherein said air conditioning output calculating unit corrects the output command value for said air conditioner on the basis of the number of surrounding trains and of a degree of congestion of the trains.

11. The vehicle air conditioning control device according to claim 1, comprising a door opening-and-closing unit that changes the number of doors to be opened and closed depending on the number of users for each time period or on the number of users for each station.

* * * * *